(12) United States Patent
Yoshida

(10) Patent No.: US 7,337,304 B2
(45) Date of Patent: Feb. 26, 2008

(54) PROCESSOR FOR EXECUTING INSTRUCTION CONTROL IN ACCORDANCE WITH DYNAMIC PIPELINE SCHEDULING AND A METHOD THEREOF

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 10/349,085

(22) Filed: Jan. 23, 2003

(65) Prior Publication Data

US 2004/0006682 A1    Jan. 8, 2004

(30) Foreign Application Priority Data

Jul. 5, 2002    (JP) .............................. 2002-197305

(51) Int. Cl.
 *G06F 9/30*    (2006.01)
(52) U.S. Cl. ..................................... 712/215
(58) Field of Classification Search ................. 712/215
 See application file for complete search history.

(56) References Cited

U.S. PATENT DOCUMENTS

| | | | | |
|---|---|---|---|---|
| 5,475,824 | A * | 12/1995 | Grochowski et al. ....... | 712/206 |
| 6,105,128 | A * | 8/2000 | Hathaway et al. ......... | 712/215 |
| 6,141,746 | A | 10/2000 | Kawano et al. | |
| 6,260,133 | B1 * | 7/2001 | Teruyama .................. | 712/209 |
| 6,370,637 | B1 * | 4/2002 | Meier et al. ............... | 712/215 |
| 6,968,444 | B1 * | 11/2005 | Kroesche et al. .......... | 712/208 |

2002/0019927 A1    2/2002    Hondou

FOREIGN PATENT DOCUMENTS

| | | |
|---|---|---|
| JP | 11-119998 A | 4/1999 |
| JP | 2001-092657 A | 4/2001 |
| JP | 2001-222428 A | 8/2001 |
| JP | 2002-055814 A | 2/2002 |

OTHER PUBLICATIONS

Architecture of the Pentium Microprocessor by Donald Alpert and Dror Avnon, Jun. 1993.*
"Advanced Computer Architectures: A Design Space Approach"; Sima et al.; 1997; Addison-Wesley.*

* cited by examiner

*Primary Examiner*—Alford Kindred
*Assistant Examiner*—Benjamin P. Geib
(74) *Attorney, Agent, or Firm*—Staas & Halsey LLP

(57) ABSTRACT

When all of a plurality of instructions are symmetry instructions, a symmetry instruction issuing unit issues the symmetry instructions to a plurality of reservation stations provided for every different arithmetic operating units until they become full. If it is determined that there is an asymmetry instruction among the plurality of instructions and the residual instructions are the symmetry instructions, an asymmetry instruction issuing unit 56 develops the asymmetry instruction into a multiflow of a previous flow and a following flow, issues the asymmetry instruction to the reservation station provided in correspondence to the specific arithmetic operating unit, and issues the residual symmetry instructions to the plurality of reservation stations provided for every different arithmetic operating units in an issuing cycle different from that of the asymmetry instruction until they become full.

9 Claims, 26 Drawing Sheets

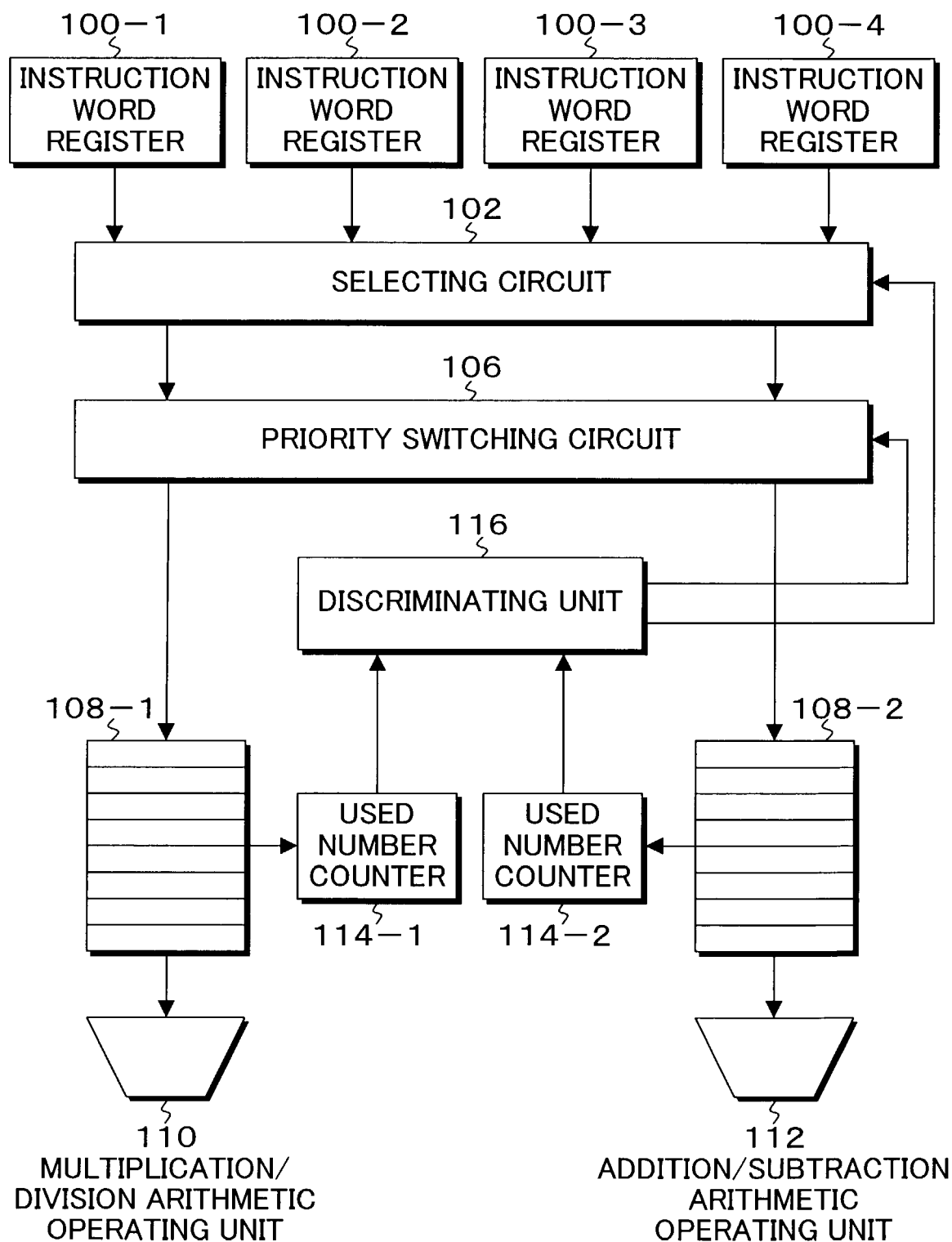

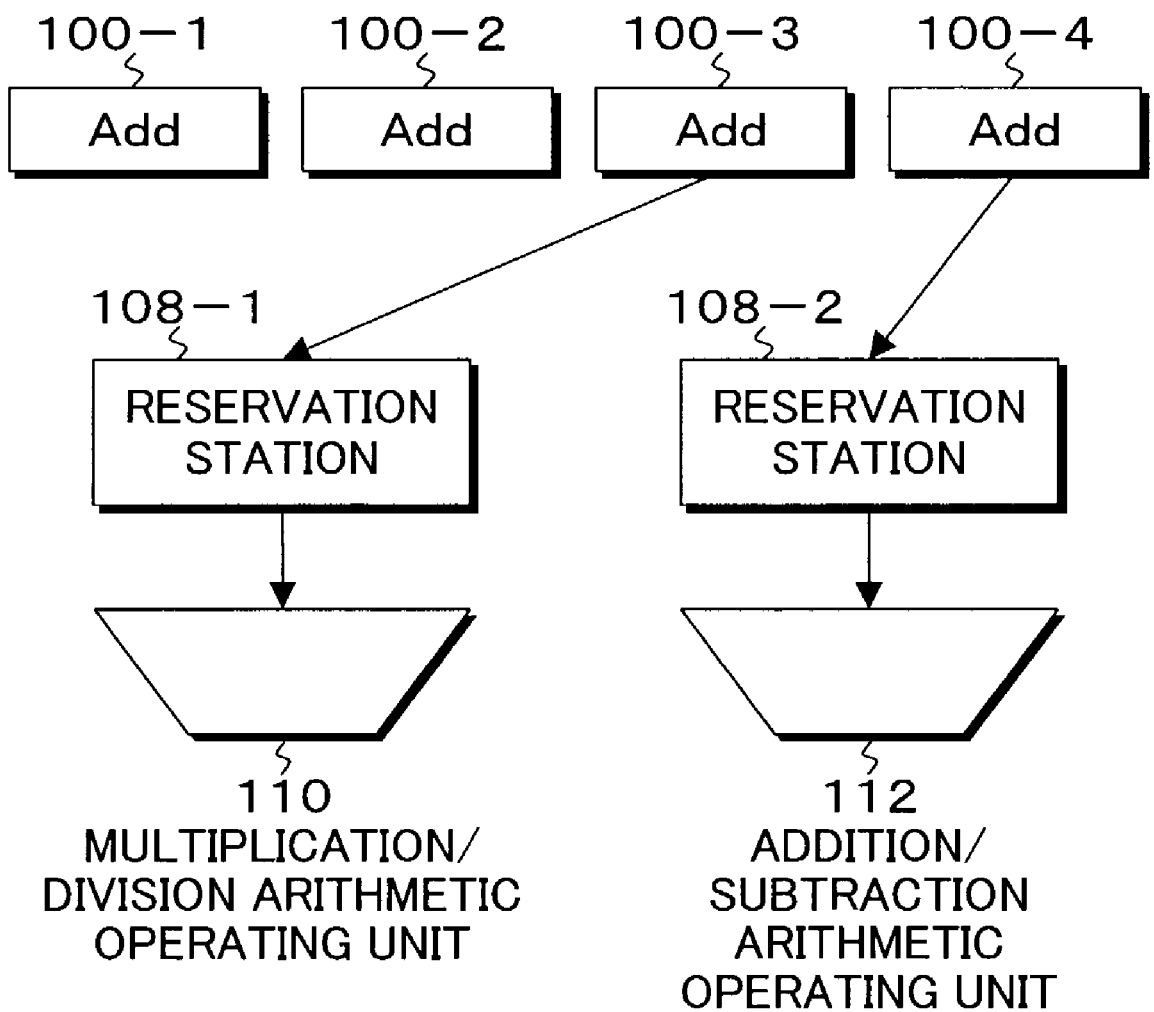

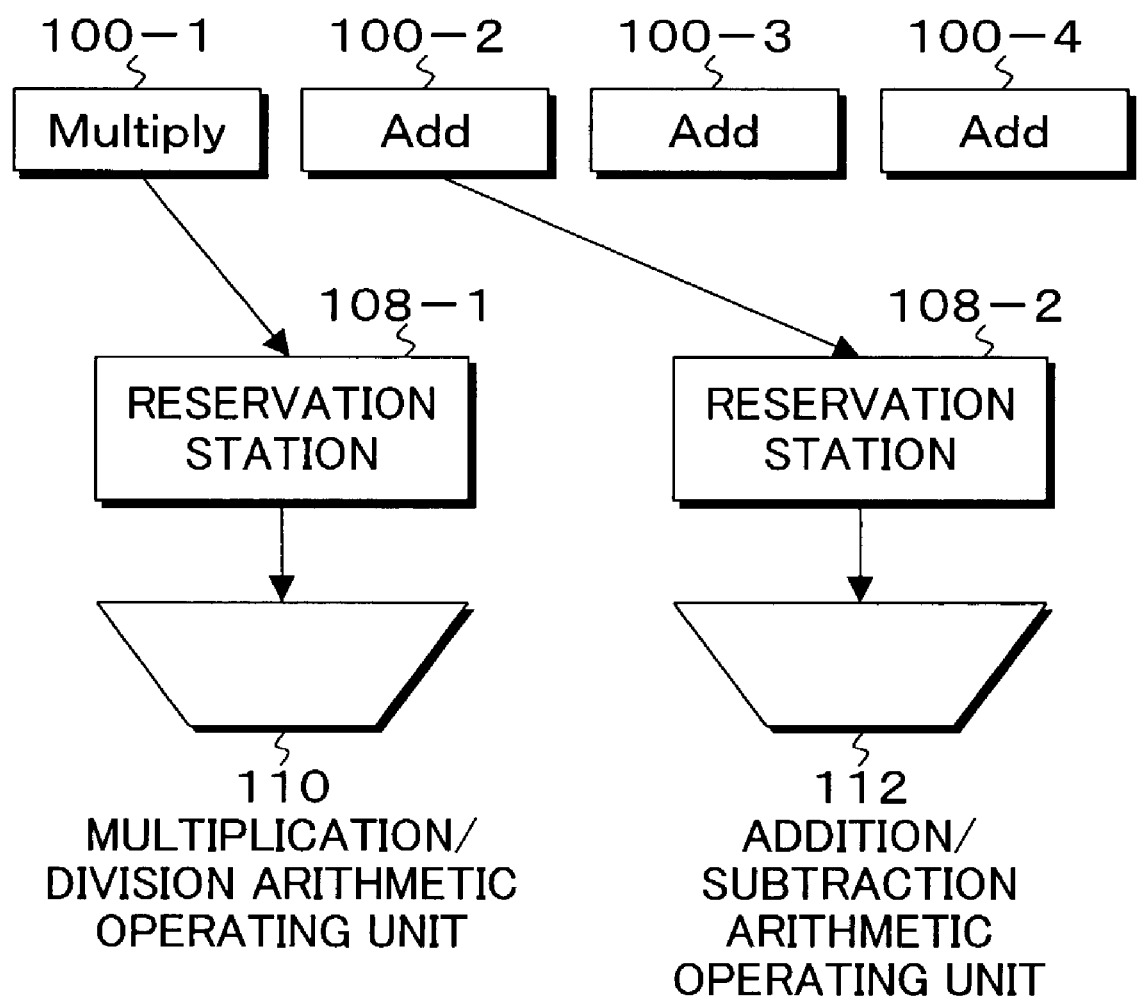

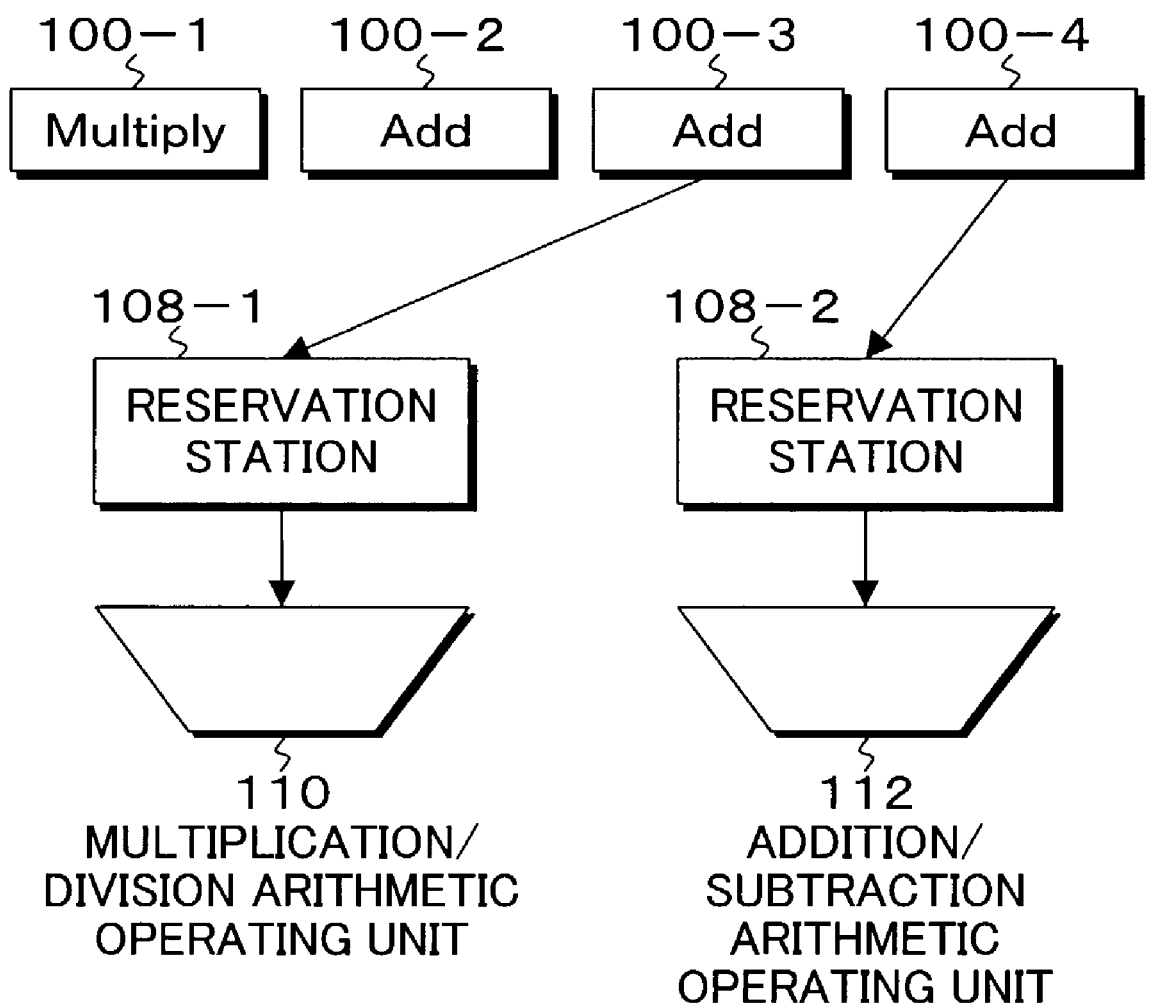

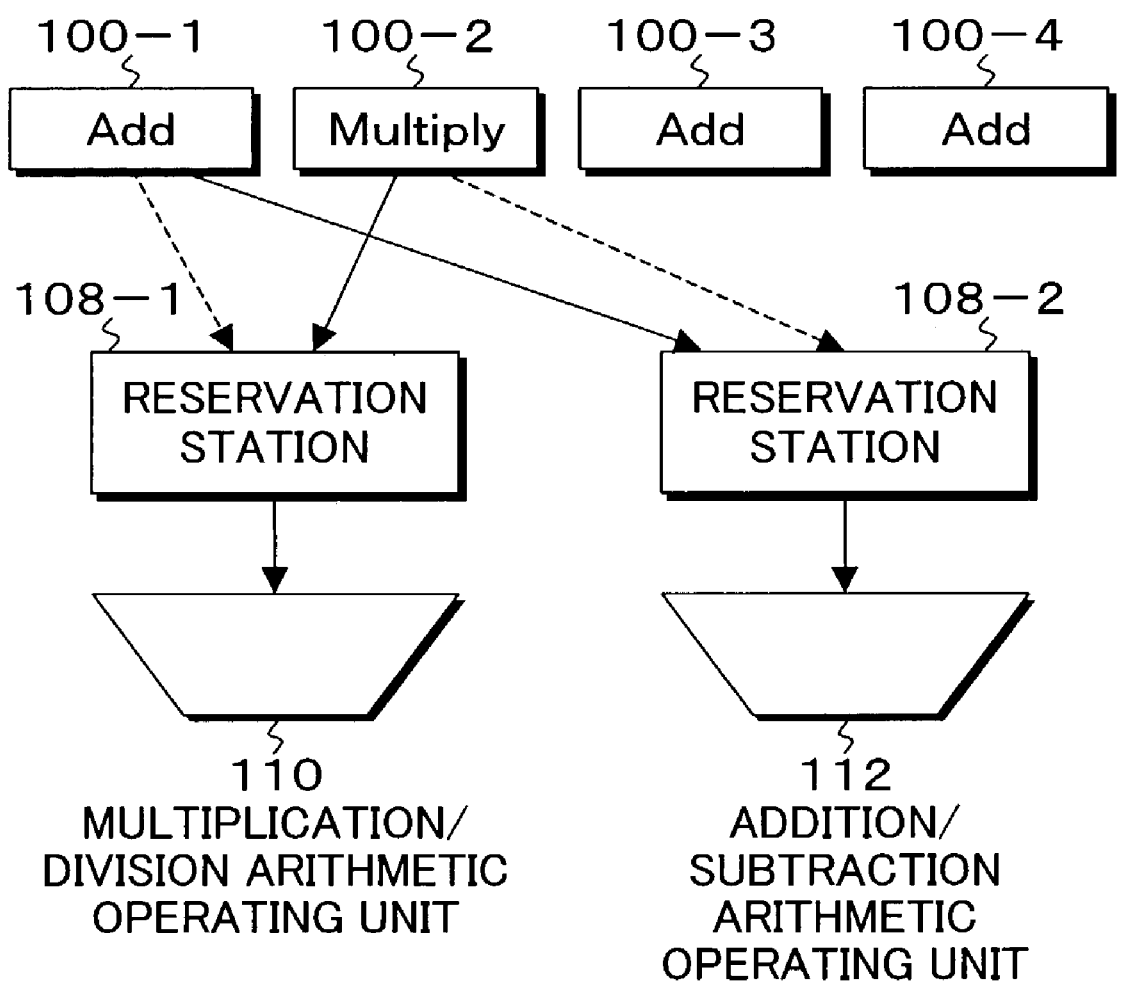

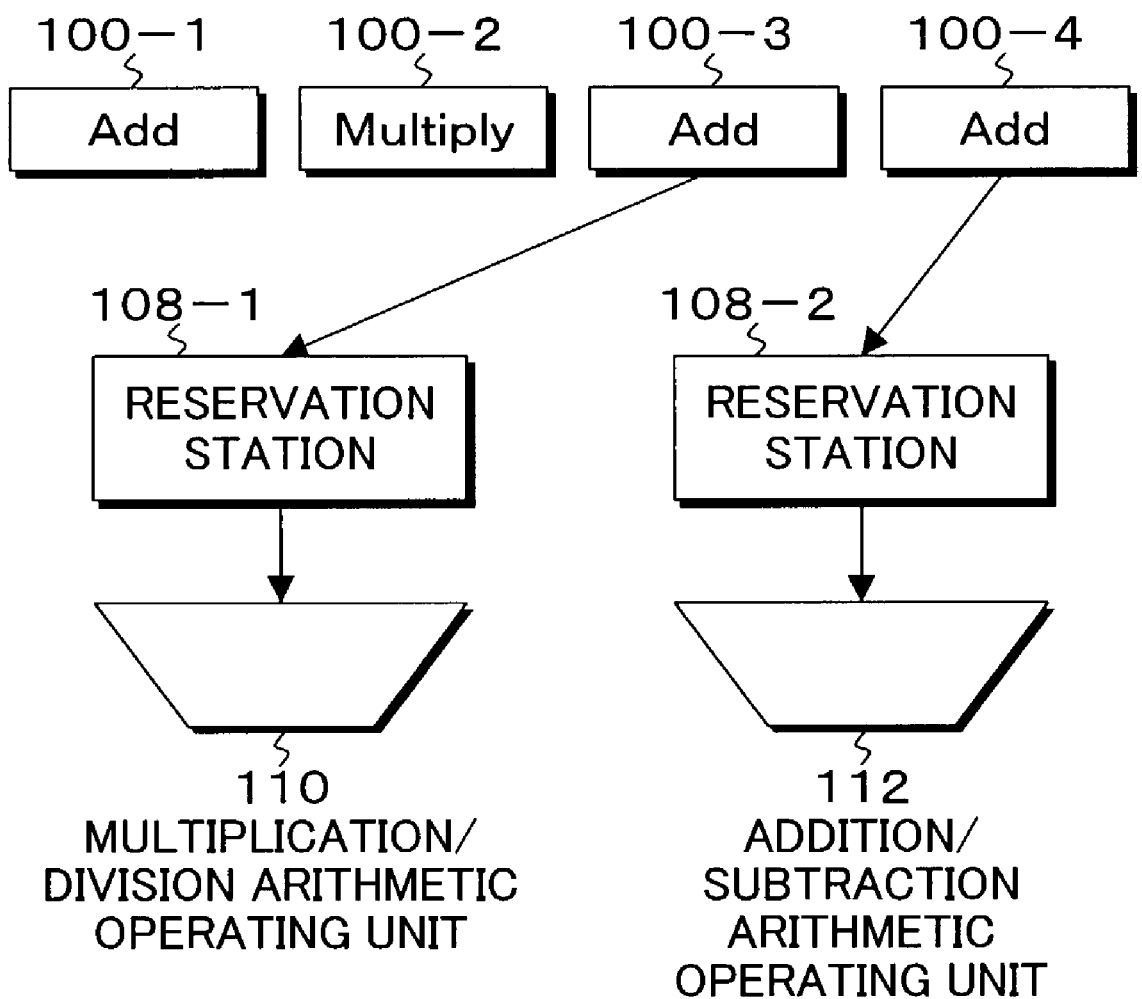

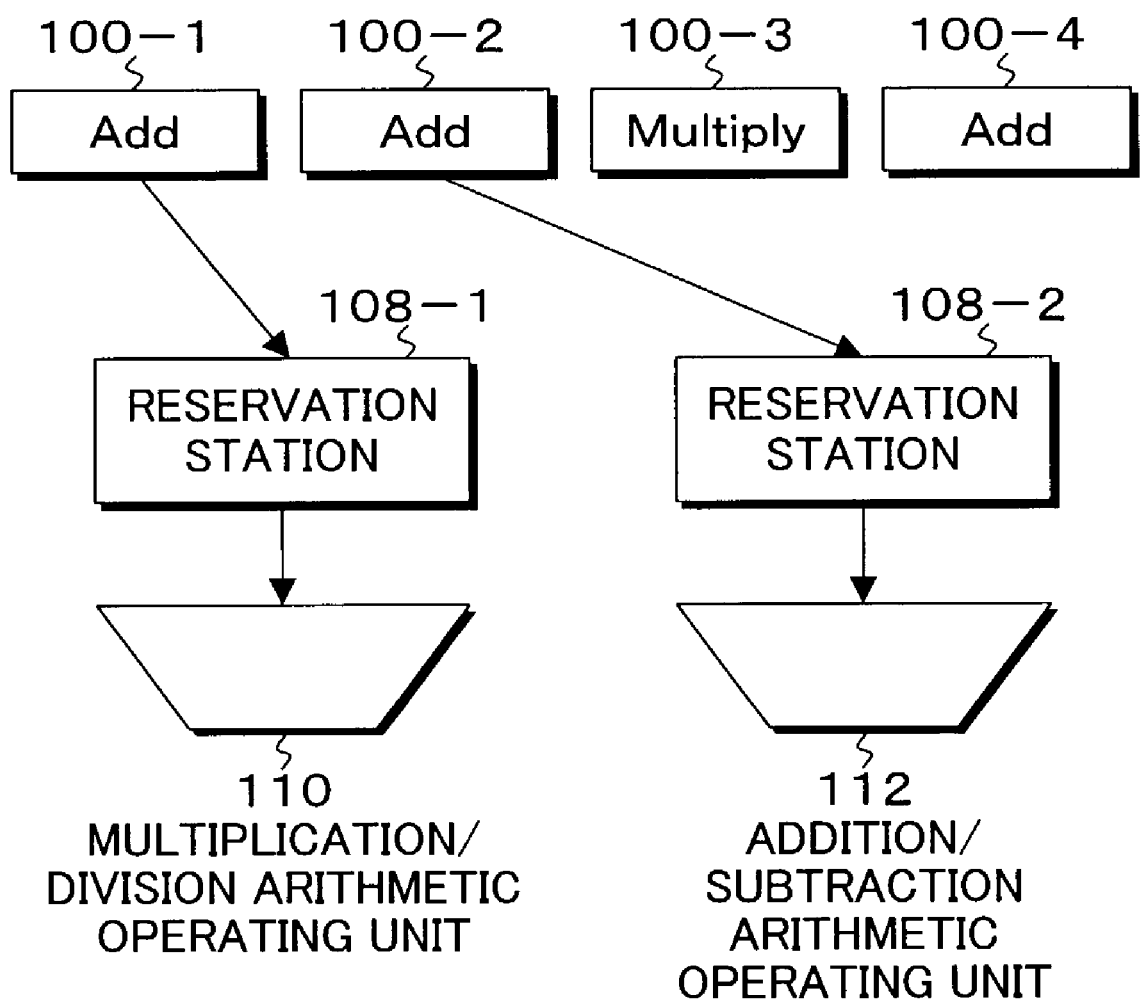

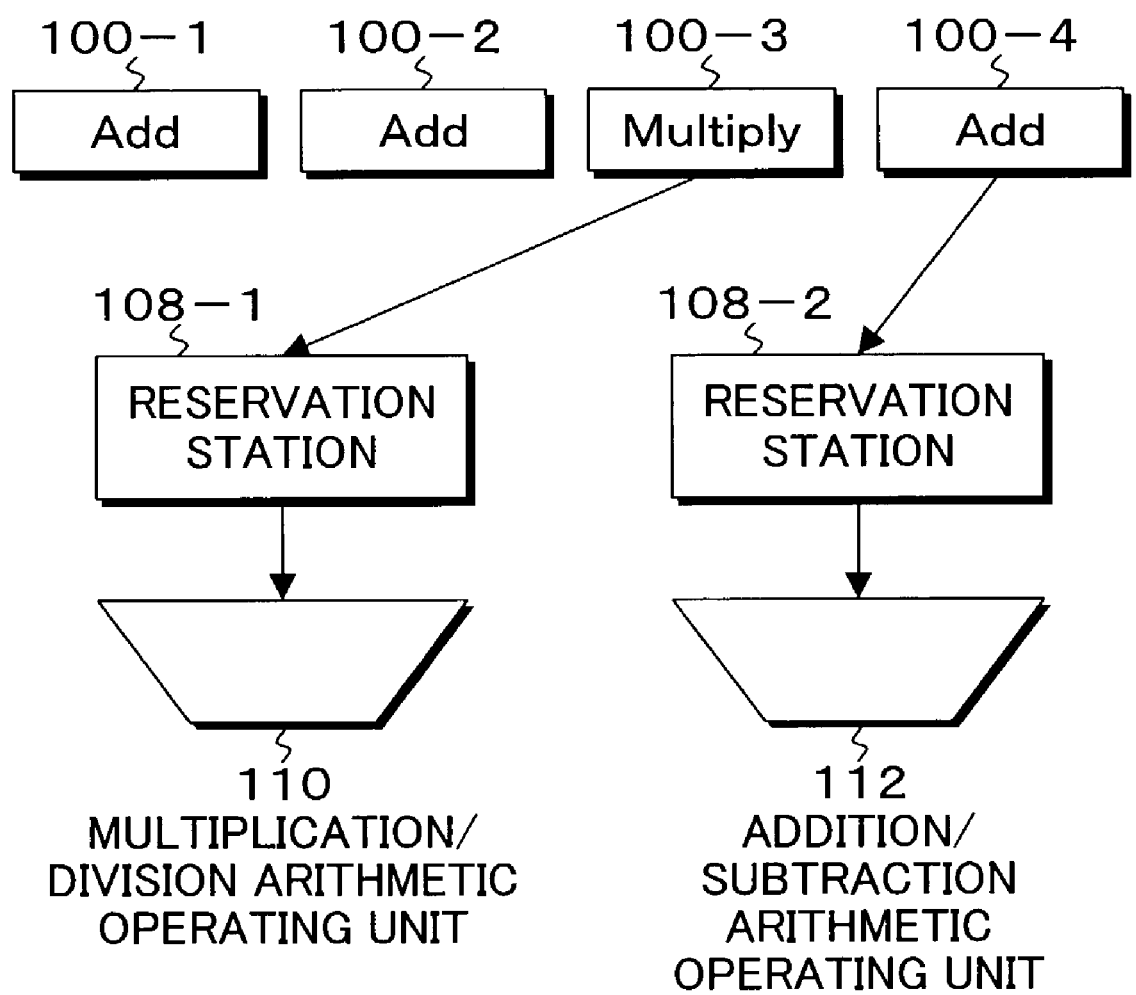

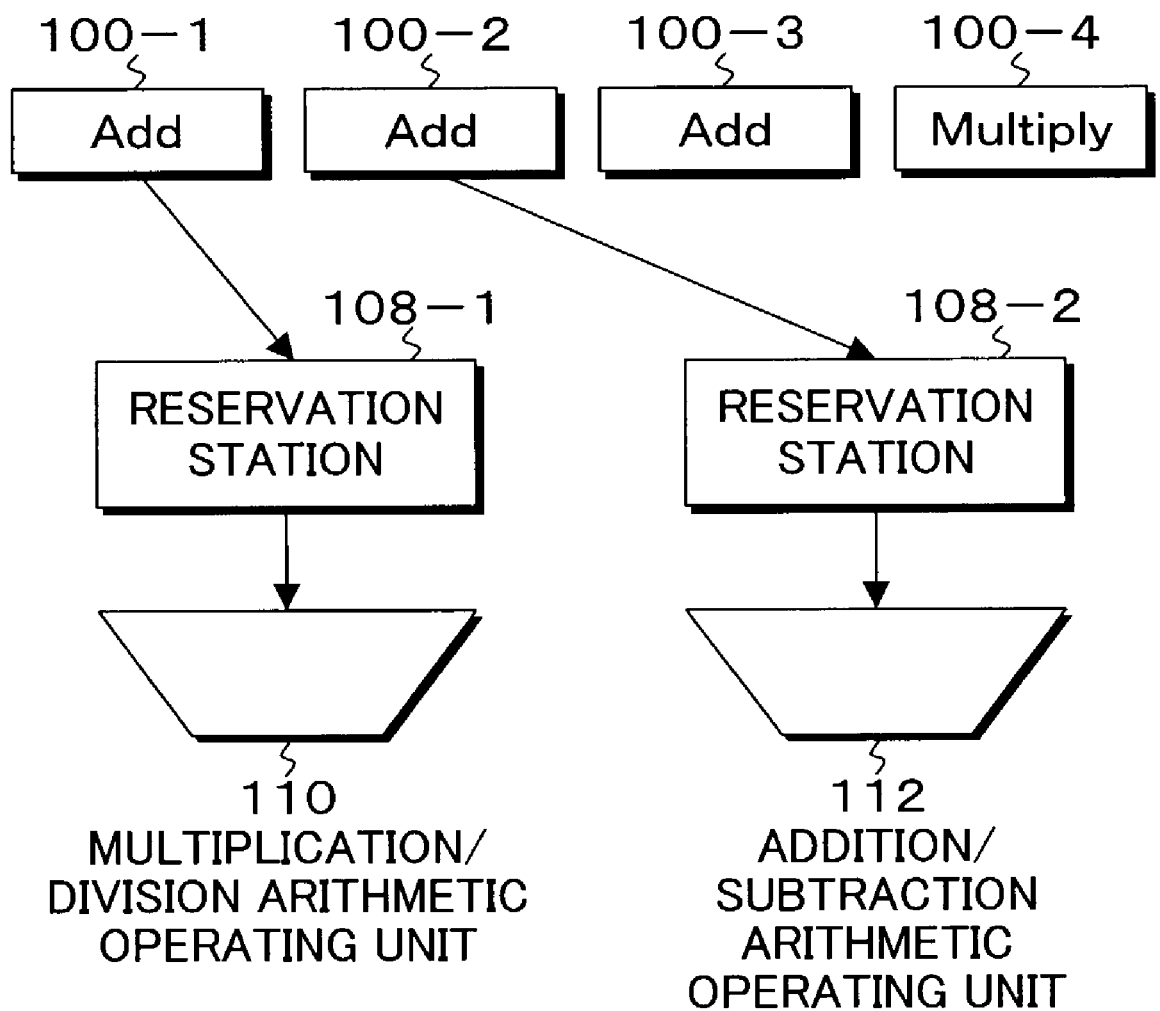

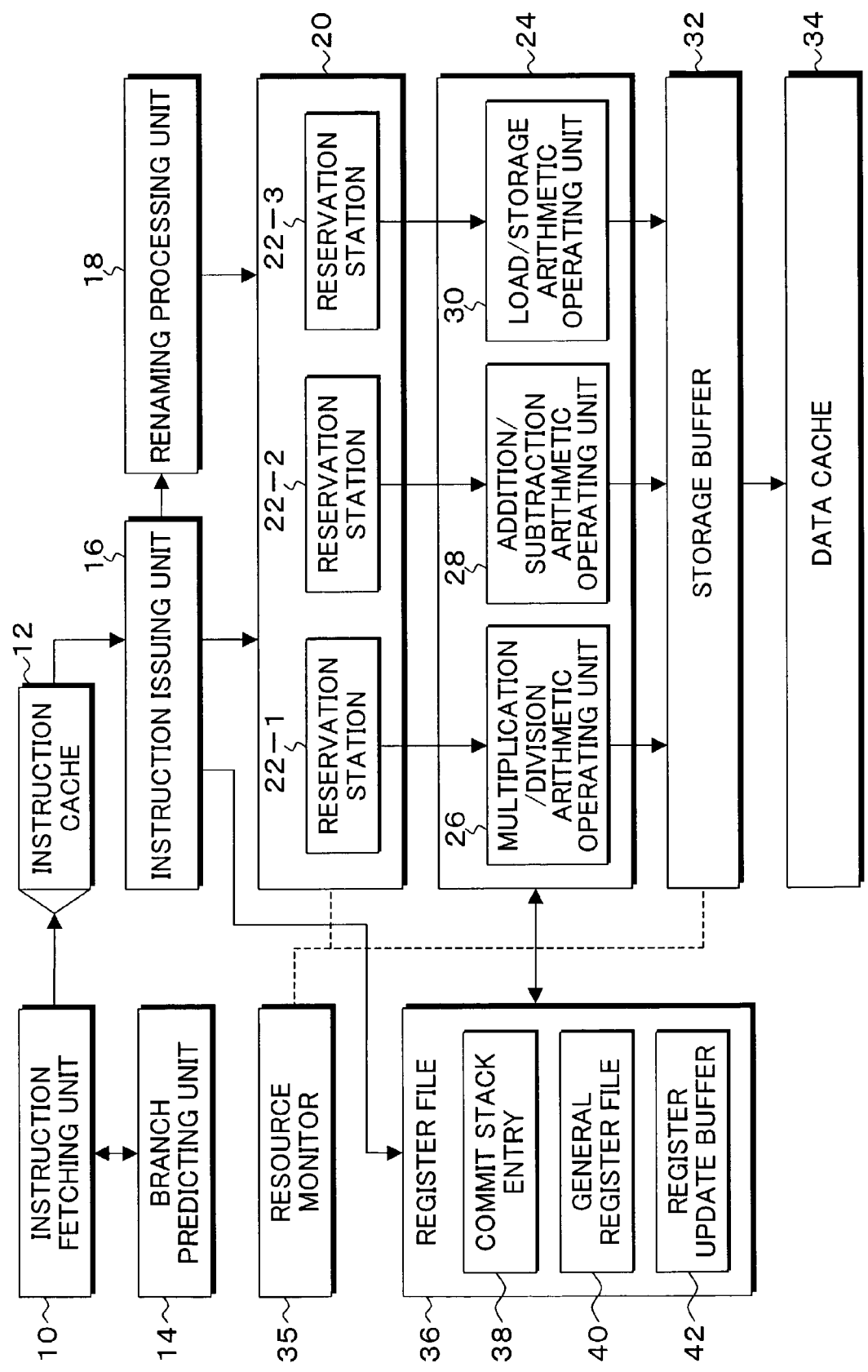

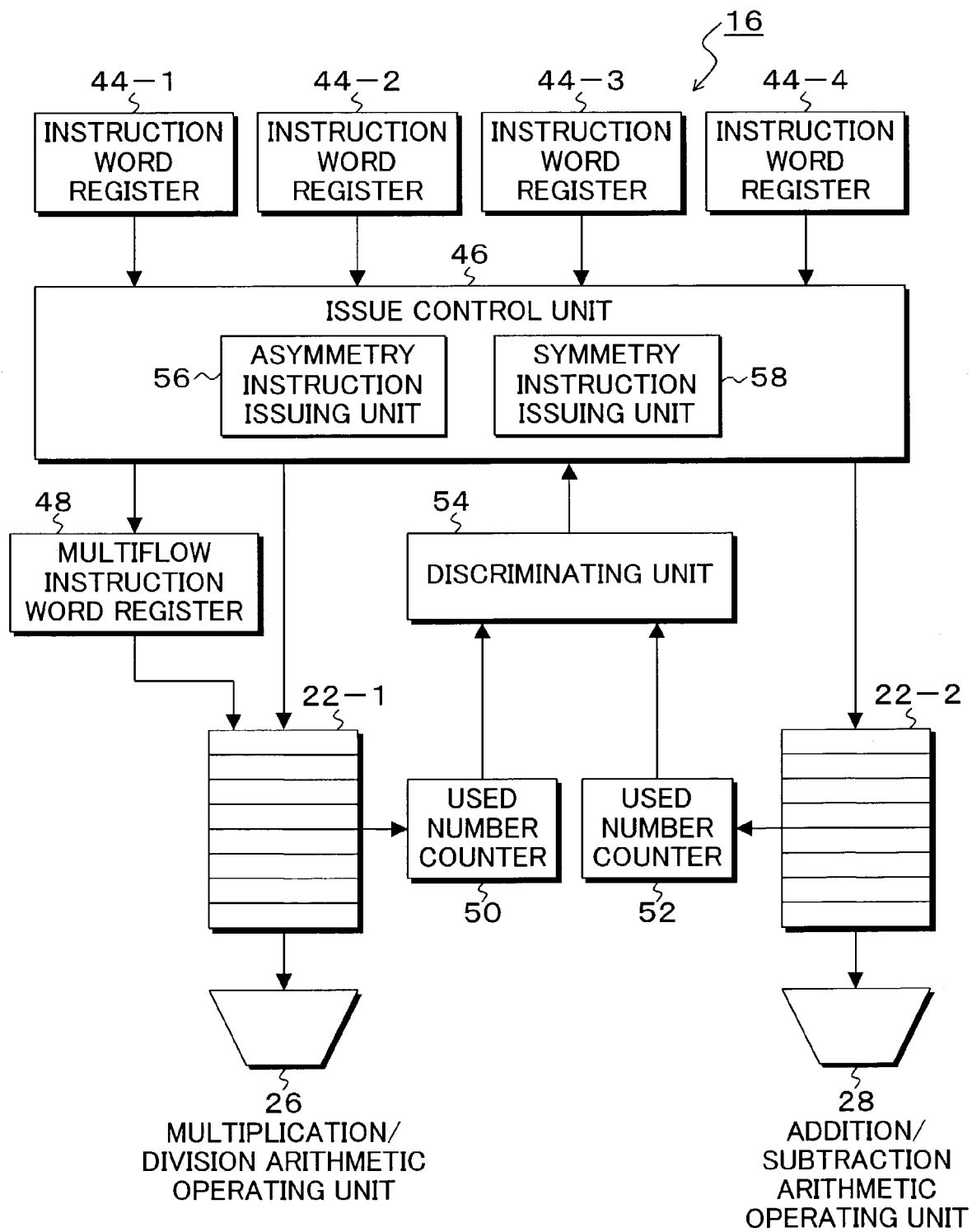

PROCESSOR FOR EXECUTING INSTRUCTION CONTROL IN ACCORDANCE WITH DYNAMIC PIPELINE SCHEDULING AND A METHOD THEREOF

BACKGROUND OF THE INVENTION

1. Field of the Invention

The invention relates to a processor and an instruction control method for executing instructions by dynamic pipeline scheduling. More particularly, the invention relates to a processor and an instruction control method for controlling issue of instructions to different kinds of arithmetic operating units.

2. Description of the Related Arts

Hitherto, in a processor for executing dynamic pipeline scheduling, processes are executed separately by three units: an instruction issuing unit of in-order depending on program order; an instruction executing unit of out-of-order which does not depend on the program order; and a committing unit of the in-order depending on the program order. That is, the instruction issuing unit fetches instructions by the in-order, decodes them, and allows a reservation station to hold the instruction operation (OP code or the like) and an operand. As soon as all operands are prepared in the reservation station and an arithmetic operating unit is made usable, the instruction executing unit speculatively executes the instruction by the out-of-order and obtains a result. The committing unit discriminates a commitment of the instruction on the basis of a branch prediction result or the like, completes the instruction by the in-order, and stores the execution result into a register file or a memory (only in the case of storage). In the processor using such dynamic pipeline scheduling, a plurality of different kinds of arithmetic operating units are provided for the instruction executing unit and it is necessary to control so as to issue an instruction in accordance with the kind of arithmetic operating unit.

FIG. 1 is an explanatory diagram of instruction issue control in the conventional processor. For example, four instruction word registers 100-1 to 100-4 are provided for an instruction issuing unit. Four instructions are simultaneously fetched from an instruction cache and decoded. The instructions in the instruction word registers 100-1 to 100-4 are issued to reservation stations 108-1 and 108-2 via a selecting circuit 102 and a priority switching circuit 106. For example, a multiplication/division arithmetic operating unit 110 and an addition/subtraction arithmetic operating unit 112 are provided for the instruction issuing unit. The multiplication/division arithmetic operating unit 110 can also execute an adding instruction and a subtracting instruction in addition to a multiplying instruction and a dividing instruction. The addition/subtraction arithmetic operating unit 112 can execute the adding instruction and the subtracting instruction but cannot execute the multiplying instruction and the dividing instruction. Therefore, the multiplying instruction, the dividing instruction, the adding instruction, and the subtracting instruction are issued to the reservation station 108-1 provided in correspondence to the multiplication/division arithmetic operating unit 110. The adding instruction and the subtracting instruction are issued to the reservation station 108-2 provided in correspondence to the addition/subtraction arithmetic operating unit 112. Since the adding instruction and the subtracting instruction can be executed by both of the multiplication/division arithmetic operating unit 110 and the addition/subtraction arithmetic operating unit 112 arranged symmetrically when they are seen from the instruction word registers 100-1 to 100-4, they are defined as symmetry instructions. On the other hand, since the multiplying instruction and the dividing instruction can be executed only by the multiplication/division arithmetic operating unit 110 locating asymmetrically when it is seen from the instruction word registers 100-1 to 100-4, they are defined as asymmetry instructions. The selecting circuit 102 sets an issuing destination at the time when the symmetry instructions are fetched into all of the instruction word registers 100-1 to 100-4 and decoded. In the example, the selecting circuit 102 sets the reservation station 108-1 as an issuing destination of the instruction word registers 100-1 and 100-3 and sets the reservation station 108-2 as an issuing destination of the instruction word registers 100-2 and 100-4. When the asymmetry instructions are fetched into one of the instruction word registers 100-1 to 100-4 and decoded, the priority switching circuit 106 switches the issuing destination so that the issuing destination of the instruction word registers holding the asymmetry instructions is set to the reservation station 108-1. Thus, the asymmetry instructions in which a frequency of generation is low are certainly issued to the reservation station provided in correspondence to the multiplication/division arithmetic operating unit 110.

FIGS. 2A and 2B show a case where an adding instruction Add has been fetched as a symmetry instruction into all of the instruction word registers 100-1 to 100-4 and decoded with respect to the prior art of FIG. 1. First, in FIG. 2A, the adding instruction Add is issued to the reservation stations 108-1 and 108-2 as issuing destinations set by the selecting circuit 102 from the instruction word registers 100-1 and 100-2. Subsequently, as shown in FIG. 2B, the adding instruction Add is issued to the reservation stations 108-1 and 108-2 as issuing destinations set by the selecting circuit 102 from the instruction word registers 100-3 and 100-4. FIGS. 2A and 2B show processes of the same decoding cycle.

FIGS. 3A and 3B show a case where a multiplying instruction Multiply as an asymmetry instruction has been fetched into the instruction word register 100-1 and decoded and the adding instruction Add has been fetched as a symmetry instruction into the residual instruction word registers 100-2 to 100-4 and decoded with respect to the prior art of FIG. 1. First, in FIG. 3A, the multiplying instruction Multiply is issued to the reservation station 108-1 as an issuing destination set by the selecting circuit 102 from the instruction word register 100-1. At the same time, the adding instruction Add is issued to the reservation station 108-2 as an issuing destination set by the selecting circuit 102 from the instruction word register 100-2. Subsequently, the same processes as those in FIG. 2B are executed in FIG. 3B.

FIGS. 4A and 4B show a case where the multiplying instruction Multiply as an asymmetry instruction has been fetched into the instruction word register 100-2 and decoded and the adding instruction Add has been fetched as a symmetry instruction into the residual instruction word registers 100-1, 100-3, and 100-4 and decoded. First, in FIG. 4A, although the issuing destination of the instruction word register 100-2 is the reservation station 108-2 set by the selecting circuit 102, since this setting is incorrect, the priority switching circuit 106 in FIG. 1 operates so as to switch the issuing destination of the instruction word register 100-2 to the reservation station 108-1. Thereafter, the multiplying instruction Multiply is issued. Subsequently, the same processes as those in FIG. 2B are executed in FIG. 4B.

FIGS. 5A and 5B show a case where the multiplying instruction Multiply as an asymmetry instruction has been fetched into the instruction word register 100-3 and decoded and the adding instruction Add has been fetched as a symmetry instruction into the residual instruction word registers 100-1, 100-2, and 100-4 and decoded. In this case, the instructions are issued in accordance with the setting of the selecting circuit 102.

FIGS. 6A and 6B show a case where the multiplying instruction Multiply as an asymmetry instruction has been fetched into the instruction word register 100-4 and decoded and the adding instruction Add has been fetched as a symmetry instruction into the residual instruction word registers 100-1 to 100-3 and decoded. First, FIG. 6A is the same as FIG. 2A. Subsequently, as shown in FIG. 6B, although the issuing destination of the instruction word register 100-4 is the reservation station 108-2 set by the selecting circuit 102, since this setting is incorrect, the priority switching circuit 106 in FIG. 1 operates so as to switch the issuing destination of the instruction word register 100-4 to the reservation station 108-1. Thereafter, the multiplying instruction Multiply is issued.

In such conventional instruction issue control, however, in the case of FIGS. 4A or 6B, since the instruction issuing destination set by the selecting circuit 102 is incorrect, it is necessary to control so as to discriminate such an incorrect situation and switch the issuing destination by the priority switching circuit 106. Thus, a control logic in the decoding cycle becomes deep by an amount corresponding to the control for switching the issuing destination by the priority switching circuit 106. That is, there is a problem such that the improvement of an operating frequency of the processor is made difficult due to the addition of the priority switching circuit in the decoding cycle.

SUMMARY OF THE INVENTION

According to the invention, there are provided a processor and an instruction control method, in which although the selecting circuit and the priority switching circuit have been necessary hitherto, when an asymmetry instruction is issued, it is developed into a multiflow, the instruction is issued only from a multiflow instruction word register, and instructions are not positively simultaneously issued from an instruction word register group of a symmetry instruction, thereby enabling the symmetry instructions from the instruction word registers to be selected and issued by a high operating frequency, and when the asymmetry instruction is issued, since the other instructions are not simultaneously issued, the selecting circuit is unnecessary and control can be simplified.

A processor according to the invention comprises: an instruction issuing unit which issues instructions by in-order; an instruction executing unit which executes the instructions by out-of-order; and a committing unit which discriminates a commitment of the instructions by the in-order and completes them, wherein instruction control is executed in accordance with dynamic pipeline scheduling. According to the invention, the above processor is characterized by comprising: a discriminating unit which discriminates whether all of a plurality of instructions which have simultaneously been fetched and decoded are symmetry instructions which can be arithmetically operated by different arithmetic operating units or there is an asymmetry instruction which can be arithmetically operated only by a specific arithmetic operating unit among the plurality of instructions and the residual instructions are the symmetry instructions; a symmetry instruction issuing unit which, in the case where it is determined that all of the plurality of instructions are the symmetry instructions, issues the symmetry instructions to a plurality of reservation stations provided for every different arithmetic operating units until they become full; and an asymmetry instruction issuing unit which, in the case where it is determined that the asymmetry instruction exists among the plurality of instructions and the residual instructions are the symmetry instructions, develops the asymmetry instruction into a multiflow of a previous flow and a following flow, issues the asymmetry instruction to the reservation station provided for the specific arithmetic operating unit, and issues the residual symmetry instructions to the plurality of reservation stations provided for the every different arithmetic operating units in an issuing cycle different from that of the asymmetry instruction until they become full. The asymmetry instruction issuing unit transfers the asymmetry instruction held in a instruction word register group to a multiflow instruction word register and holds it in a decoding cycle of the previous flow and issues the asymmetry instruction in the multiflow instruction word register to the corresponding reservation station in a decoding cycle of the following flow. As mentioned above, according to the invention, the asymmetry instruction is internally developed into the multiflow of the previous flow and the following flow, an instruction operation of the previous flow is handled as a no-operation, at the same time, the asymmetry instruction is transferred and held into the multiflow instruction word register, and as an instruction operation of the next following flow, the asymmetry instruction is issued from the multiflow instruction word register to the corresponding reservation station. By holding the residual instructions in the instruction word registers, there is no need to switch the issue of the other instructions in the same cycle. Thus, the asymmetry instruction can be preferentially issued to the specific reservation station by the operation of a high frequency.

The asymmetry instruction issuing unit issues the symmetry instructions locating before the asymmetry instruction held in the plurality of instruction word registers to the plurality of reservation stations in the decoding cycle of the previous flow and, further, issues the residual symmetry instructions to the plurality of reservation stations in a decoding cycle next to the decoding cycle of the following flow. The symmetry instruction issuing unit and the asymmetry instruction issuing unit issue the symmetry instructions held in the plurality of instruction word registers to the reservation station which has been predetermined in correspondence to a position of the register. Further, when the symmetry instructions are issued to the predetermined reservation station, if a using state of the reservation station of an issuing destination is full, they are issued to another reservation station having an empty space in the using state. Thus, a stall at the decoding stage is avoided until the reservation station becomes full. The symmetry instruction is an adding instruction or a subtracting instruction. The asymmetry instruction is a multiplying instruction or a dividing instruction. The executing unit is provided with: an asymmetry instruction arithmetic operating unit which can execute arithmetic operations of the adding instruction, the subtracting instruction, the multiplying instruction, and the dividing instruction; and a symmetry instruction arithmetic operating unit which can execute the arithmetic operations of the adding instruction and the subtracting instruction.

According to the invention, there is provided a processor instruction control method which has an instruction issuing step wherein instructions are issued by in-order, an instruction executing step wherein the instructions are executed by out-of-order, and a committing step wherein a commitment of the instructions is discriminated by the in-order and the instructions are completed, and in which the instructions are executed in accordance with dynamic pipeline scheduling.

The above instruction control method is characterized by comprising:

an instruction discriminating step wherein whether all of a plurality of instructions which have simultaneously been fetched and decoded are symmetry instructions which can be arithmetically operated by different arithmetic operating units or there is an asymmetry instruction which can be arithmetically operated only by a specific arithmetic operating unit among the plurality of instructions and the residual instructions are the symmetry instructions is discriminated;

a symmetry instruction issuing step wherein in the case where it is determined that all of the plurality of instructions are the symmetry instructions, the symmetry instructions are issued to a plurality of reservation stations provided for every different arithmetic operating units until they become full; and an asymmetry instruction issuing step wherein in the case where it is determined that the asymmetry instruction exists among the plurality of instructions and the residual instructions are the symmetry instructions, the asymmetry instruction is developed into a multiflow of a previous flow and a following flow, the asymmetry instruction is issued to the reservation station provided in correspondence to the specific arithmetic operating unit, and the residual symmetry instructions are issued to the plurality of reservation stations provided for the every different arithmetic operating units in an issuing cycle different from that of the asymmetry instruction until they become full.

Details of the instruction control method are fundamentally the same as those in the case of the processor.

The above and other objects, features, and advantages of the present invention will become more apparent from the following detailed description with reference to the drawings.

BRIEF DESCRIPTION OF THE DRAWINGS

FIG. 1 is a functional block diagram of conventional instruction issue control for issuing an asymmetry instruction to a specific reservation station by a preferential switching;

FIGS. 2A and 2B are explanatory diagrams of the conventional instruction issue control in the case where a symmetry instruction has been fetched into all instruction word registers and decoded;

FIGS. 3A and 3B are explanatory diagrams of conventional instruction issue control in the case where an asymmetry instruction has been fetched into the first instruction word register and decoded;

FIGS. 4A and 4B are explanatory diagrams of conventional instruction issue control in the case where the asymmetry instruction has been fetched into the second instruction word register and decoded;

FIGS. 5A and 5B are explanatory diagrams of conventional instruction issue control in the case where the asymmetry instruction has been fetched into the third instruction word register and decoded;

FIGS. 6A and 6B are explanatory diagrams of conventional instruction issue control in the case where the asymmetry instruction has been fetched into the fourth instruction word register and decoded;

FIG. 7 is a block diagram of a hardware construction of a processor according to the invention;

FIG. 8 is a functional block diagram of instruction issue control of the invention in the processor of FIG. 7;

DETAILED DESCRIPTION OF THE PREFERRED EMBODIMENT

Figure 2A:
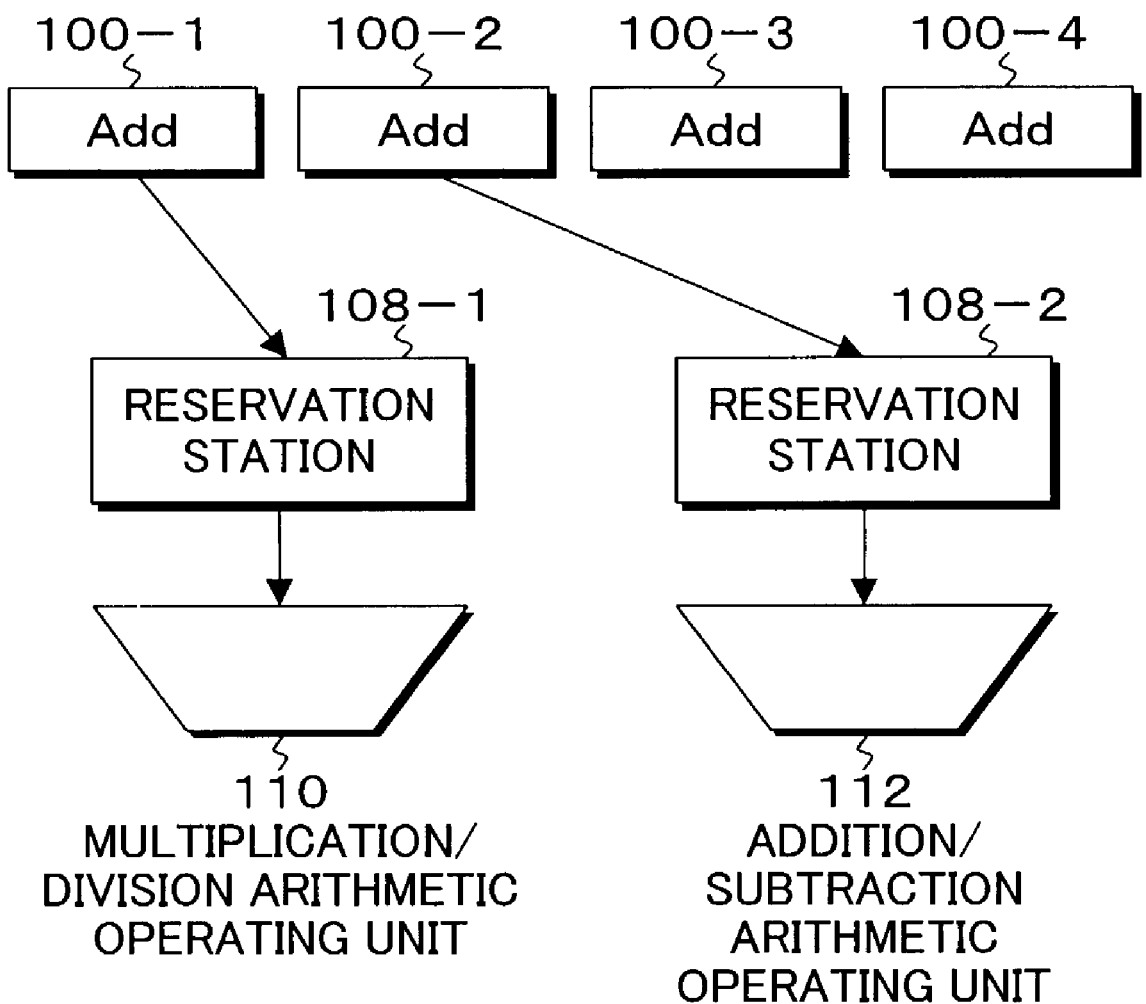
Figure 6B:
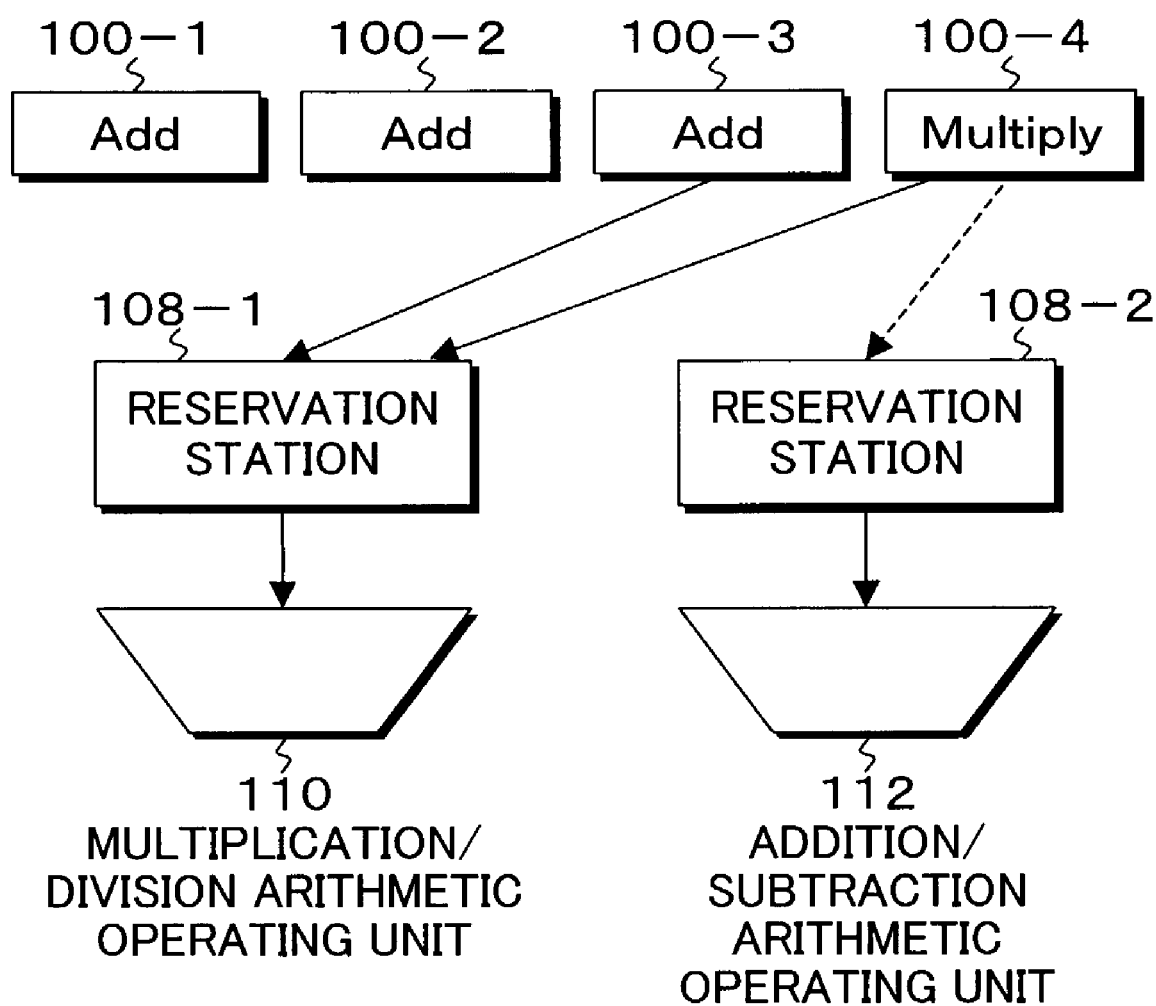

FIG. 7 is a block diagram of a hardware construction of a processor for executing instructions by dynamic pipeline scheduling and making instruction issue control according to the invention. The processor comprises: an instruction fetching unit 10; a branch predicting unit 14; an instruction cache 12; an instruction issuing unit 16; a renaming processing unit 18; a reservation station processing unit 20; an instruction executing unit 24; a storage buffer 32; a data cache 34; a resource monitor 35; and a register file 36. Reservation stations 22-1 to 22-3 are provided for the reservation station processing unit 20. A multiplication/division arithmetic operating unit 26, an addition/subtraction arithmetic operating unit 28, and a load/storage arithmetic operating unit 30 are provided for the instruction executing unit 24. The multiplication/division arithmetic operating unit 26 can execute an adding instruction operation and a subtracting instruction operation in addition to a multiplying instruction operation and a dividing instruction operation and functions as an asymmetry instruction arithmetic operating unit. The addition/subtraction arithmetic operating unit 28 can execute the adding instruction operation and the subtracting instruction operation but cannot execute the multiplying instruction operation and the dividing instruction operation, and functions as a symmetry instruction arithmetic operating unit. Therefore, the instruction operations can be executed by the multiplication/division arithmetic operating unit 26 and the addition/subtraction arithmetic operating unit 28 locating symmetrically with respect to the adding instruction and the subtracting instruction when they are seen from the instruction issuing unit 16, so that the adding instruction and the subtracting instruction are called symmetry instructions. As for the symmetry instruction, the instruction issuing unit 16 can issue it to which one of the reservation stations 22-1 and 22-2. On the other hand, with respect to the multiplying instruction and the dividing instruction, the instruction operations can be executed only by the multiplication/division arithmetic operating unit 26 having an asymmetrical positional relation when it is seen from the instruction issuing unit 16, so that the multiplying instruction and the dividing instruction are called asymmetry instructions. With respect to the asymmetry instruction, since the instruction operation can be executed only by the multiplication/division arithmetic operating unit 26, the instruction issuing unit 16 certainly issues the asymmetry instruction to the reservation station 22-1. In the instruction issue control according to the invention, the asymmetry instruction is internally developed into a multiflow of a previous flow and a following flow and issued to the reservation station via the instruction operation of the multiflow. The register file 36 has: a commit stack entry 38; a general register file 40 known as an architecture register file; and a register update buffer 42 serving as a target of register allocation of the renaming processing unit 18. The instruction cache 12 and the data cache 34 are connected to a memory via a system controller from an interface (not shown) corresponding to an SPARC port architecture.

A fundamental processing procedure of the processor of the invention for executing the dynamic pipeline scheduling in FIG. 7 will be explained hereinbelow. The instruction fetching unit 10 fetches collectively, for example, four instructions from a queue on the instruction cache 12 side into four instruction word registers (not shown) in the instruction issuing unit 16 and decodes them. The decoded four instructions are sent to the reservation station processing unit 20. The reservation station processing unit 20 has, for example, the two reservation stations 22-1 and 22-2 for arithmetic operations and stores instructions into the reservation stations having empty spaces with a predetermined relation. Each of the reservation stations 22-1 and 22-2 has, for example, eight entries, so that they can reserve a total of 16 arithmetic operating instructions. The issue of the instructions to the reservation station processing unit 20 is executed by the in-order according to the order of the program. Simultaneously with that the instructions are issued to the reservation stations 22-1 and 22-2, the entry is also allocated to the commit stack entry 38 every instruction and held until it is released by a commitment of the instruction. In the embodiment, the commit stack entry 38 has 64 entries. Therefore, no instruction is issued from the instruction word registers of the instruction issuing unit 16 unless there are the entries in the corresponding reservation stations 22-1 and 22-2 of the reservation station processing unit 20, the commit stack entry 38, and resources (a register update buffer, a storage buffer, etc.) which are necessary for executing the instructions, but they are stalled in the decoding cycle. When all operands of the instructions are prepared in the reservation station 22-1 or 22-2 and the corresponding multiplication/division arithmetic operating unit 26 or addition/subtraction arithmetic operating unit 28 enters a state where an arithmetic operation can be performed, the instruction executing unit 24 immediately executes the instruction operation and an execution result is obtained. The operations for executing the instructions in the instruction executing unit 24 are not performed in order of the program but are successively and speculatively executed by the out-of-order from the executable instruction. By receiving a discrimination result indicative of establishment of a branch or the like, the instruction is committed and the execution result of the instruction executing unit 24 is stored into the storage buffer 32. After that, if the instruction is a storing instruction, it is stored into the data cache 34 and the instruction is completed by the in-order. If the instruction is another arithmetic operating instruction, it is further stored into the corresponding register in the general register file 40 and the instruction is completed by the in-order. When the instruction is committed as mentioned above, the allocation entry in the commit stack entry 38 is released. The processor of the invention executes the instruction operation by the out-of-order in the instruction executing unit 24 and the instructions are not executed in order of the program, therefore, a dedicated register to hold information has to be allocated every instruction. Since, for example, four instruction word registers are prepared for the instruction issuing unit 16 in FIG. 7, if four dedicated registers cannot be allocated, the instructions cannot be simultaneously stored into the reservation station processing unit 20 but have to be stalled in the decoding cycle at a point when the dedicated registers have fully been allocated. The register update buffer 42 is prepared as a dedicated register which is allocated every instruction. In the embodiment, the register update buffer 42 has, for example, 64 entries.

A register renaming is known as a method whereby the dedicated register is allocated every instruction and contents in the register are updated in order of the program and referred to. The register renaming will be specifically explained hereinbelow. It is now assumed that the following instructions 1, 2, and 3 exist.

| Instruction 1 | R1 + R2 = R3 |
| Instruction 2 | R3 + R4 = R3 |
| Instruction 3 | R3 + R8 = R9 |

Among those three instructions 1, 2, and 3, there is a dependent relation between a destination register R3 of the instruction 1 and a first operand register R3 of the instruction 2. There is also a dependent relation between a destination register R3 of the instruction 2 and a first operand register R3 of the instruction 3. In such a case, in the register renaming, the destination register R3 of the instruction 1 and the first operand register R3 of the instruction 2 are set to, for example, a renaming register R3$a$ and the dedicated register is allocated. A renaming register R3$b$ is allocated to the destination register R3 of the instruction 2 and the first operand register R3 of the instruction 3. Use of the renaming register R3$a$ allocated upon decoding of the instruction is assured until the instruction 1 is committed. Use of the renaming register R3$b$ is assured until the instruction 2 is committed. When the instruction is committed, it is read out from the destination register R3 itself.

FIG. 8 is a functional block diagram of the instruction issue control of the invention in the processor of FIG. 7. Four instruction word registers 44-1 to 44-4 are provided for the instruction issuing unit 16. Four instructions are simultaneously fetched from the instruction cache 12 accessed by the instruction fetching unit 10 in FIG. 7 and decoded. The instructions are fetched in order of the instruction word registers 44-1, 44-2, 44-3, and 44-4. The instructions fetched into the instruction word registers 44-1 to 44-4 and decoded are sent to the reservation stations 22-1 and 22-2 via an issue control unit 46. The instructions are executed by the out-of-order by the multiplication/division arithmetic operating unit 26 and the addition/subtraction arithmetic operating unit 28 provided in correspondence to them. With respect to the adding instruction and the subtracting instruction as symmetry instructions, since the instruction operations can be also executed by the multiplication/division arithmetic operating unit 26, for those symmetry instructions, both of the reservation stations 22-1 and 22-2 are set to the issuing destination of the instruction. On the other hand, with respect to the multiplying instruction or the dividing instruction as an asymmetry instruction, since the instruction operation can be executed only by the multiplication/division arithmetic operating unit 26, only the reservation station 22-1 is set to the issuing destination of the asymmetry instruction. A multiflow instruction word register 48 is provided for the reservation station 22-1 side serving as an issuing destination of the asymmetry instruction. With respect to the instructions fetched into the instruction word registers 44-1 to 44-4 and decoded, the multiflow instruction word register 48 transfers the instruction used at the time when it has been internally developed into the multiflow and holds it. An asymmetry instruction issuing unit 56 and a symmetry instruction issuing unit 58 are provided for the issue control unit 46. Used number counters 50 and 52 are provided for the reservation stations 22-1 and 22-2. When an instruction is issued from the instruction issuing unit 16, the used number counters 50 and 52 count up by 1. When an instruction is sent to the multiplication/division arithmetic operating unit 26 or the addition/subtraction arithmetic operating unit 28 on the instruction executing unit side, the used number counters 50 and 52 count down by 1. Therefore, by seeing count values of the used number counters 50 and 52, the number of used entries of each of the reservation stations 22-1 and 22-2 can be known, so that whether there is an empty space or not can be discriminated. A discriminating unit 54 monitors entry using states of the reservation stations 22-1 and 22-2 by referring to the count values of the used number counters 50 and 52. If the reservation stations 22-1 and 22-2 become full, a process for inputting the instruction to the reservation station side having an empty space is instructed to the issue control unit 46. When all symmetry instructions serving as an adding instruction and/or a subtracting instruction are fetched into the instruction word registers 44-1 to 44-4 and decoded, the symmetry instruction issuing unit 58 sets a rule for issuing the symmetry instructions to the reservation stations 22-1 and 22-2 which have been preset in correspondence to the positions of the instruction word registers 44-1 to 44-4.

Figure 9A:
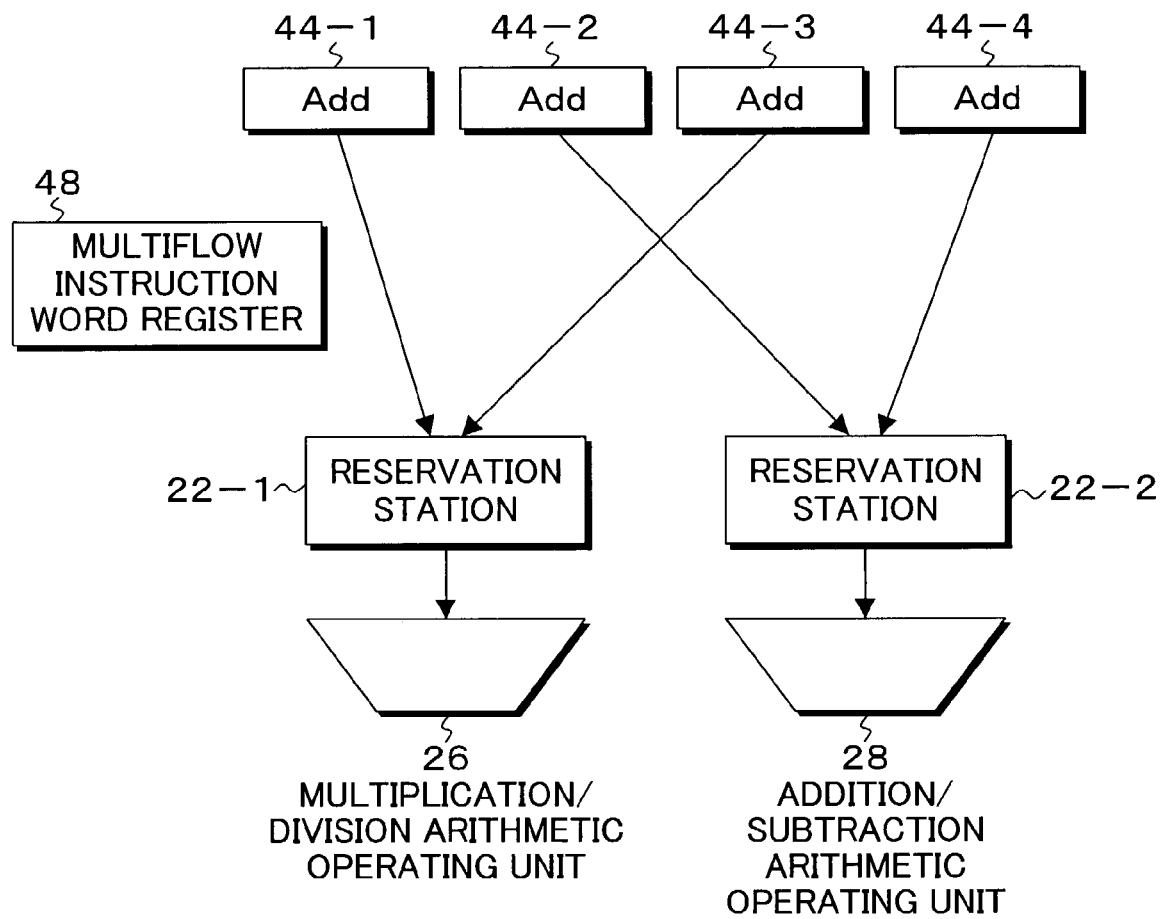
FIGS. 9A and 9B are explanatory diagrams of instruction issue control in the case where the symmetry instruction has been fetched into all instruction word registers and decoded.
Figure 9B:
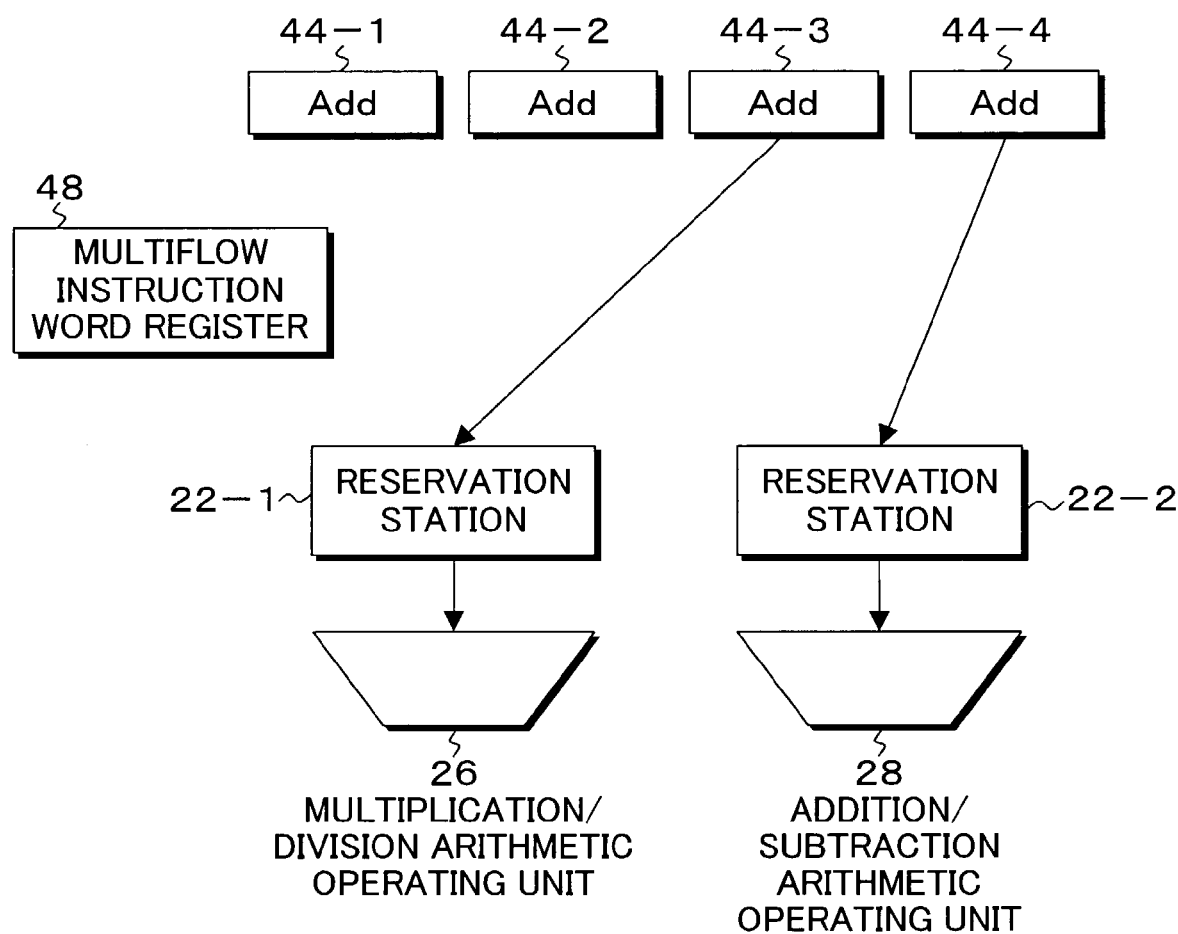

FIGS. 9A and 9B show instruction issue control which is performed by the symmetry instruction issuing unit 58 in FIG. 8 in the case where the adding instruction Add is used as a symmetry instruction as an example. Although the control is separately shown in FIGS. 9A and 9B, each control is made in the same decoding cycle. In FIG. 9A, if the adding instruction Add is fetched into all of the instruction word registers 44-1 to 44-4, since the issuing destination of the instruction word register 44-1 has been preset to the reservation station 22-1 and the issuing destination of the instruction word register 44-2 has been preset to the reservation station 22-2, the adding instruction is issued under a condition that there is an empty space in the reservation stations 22-1 and 22-2. Subsequently, in FIG. 9B, since the issuing destination of the instruction word registers 44-1 and 44-3 has been preset to the reservation station 22-1 and the issuing destination of the instruction word registers 44-2 and 44-4 has been preset to the reservation station 22-2, the adding instruction Add is issued to the corresponding issuing destination. Therefore, in the case where every four continuous symmetry instructions of the adding instruction or the subtracting instruction have simultaneously been fetched into all of the instruction word registers 44-1 to 44-4 and decoded, so long as there is an empty space in the reservation stations 22-1 and 22-2, the instructions are continuously issued, so that the stall at the decoding stage can be avoided. For example, the symmetry instruction issuing unit 58 sets a rule in a manner such that if it is determined by the discriminating unit 54 from the count value of the used number counter 50 in FIG. 8 that the reservation station 22-1 of the issuing destination of the adding instruction Add of the instruction word register 44-1 in FIG. 9 is in the full state, a state of the other reservation station 22-2 is recognized from the count value of the used number counter 52, and if there is an empty space, the issuing destination is changed to the reservation station 22-2 and the adding instruction Add is issued. By such an instruction issuing rule, the stall in the decoding cycle can be avoided with respect to the symmetry instructions until the two reservation stations 22-1 and 22-2 become full.

Referring again to FIG. 8, the asymmetry instruction issuing unit 56 provided for the issue control unit 46 makes asymmetry instruction issue control such that in the case where the asymmetry instruction serving as a multiplying instruction or a dividing instruction has been fetched into one of the instruction word registers 44-1 to 44-4 and decoded and the symmetry instruction comprising the adding instruction or the subtracting instruction has been fetched into the residual instruction word registers and decoded, the asymmetry instruction is internally developed into the multiflow of the previous flow and the following flow and issued to the dedicated reservation station 22-1.

Figure 10A:
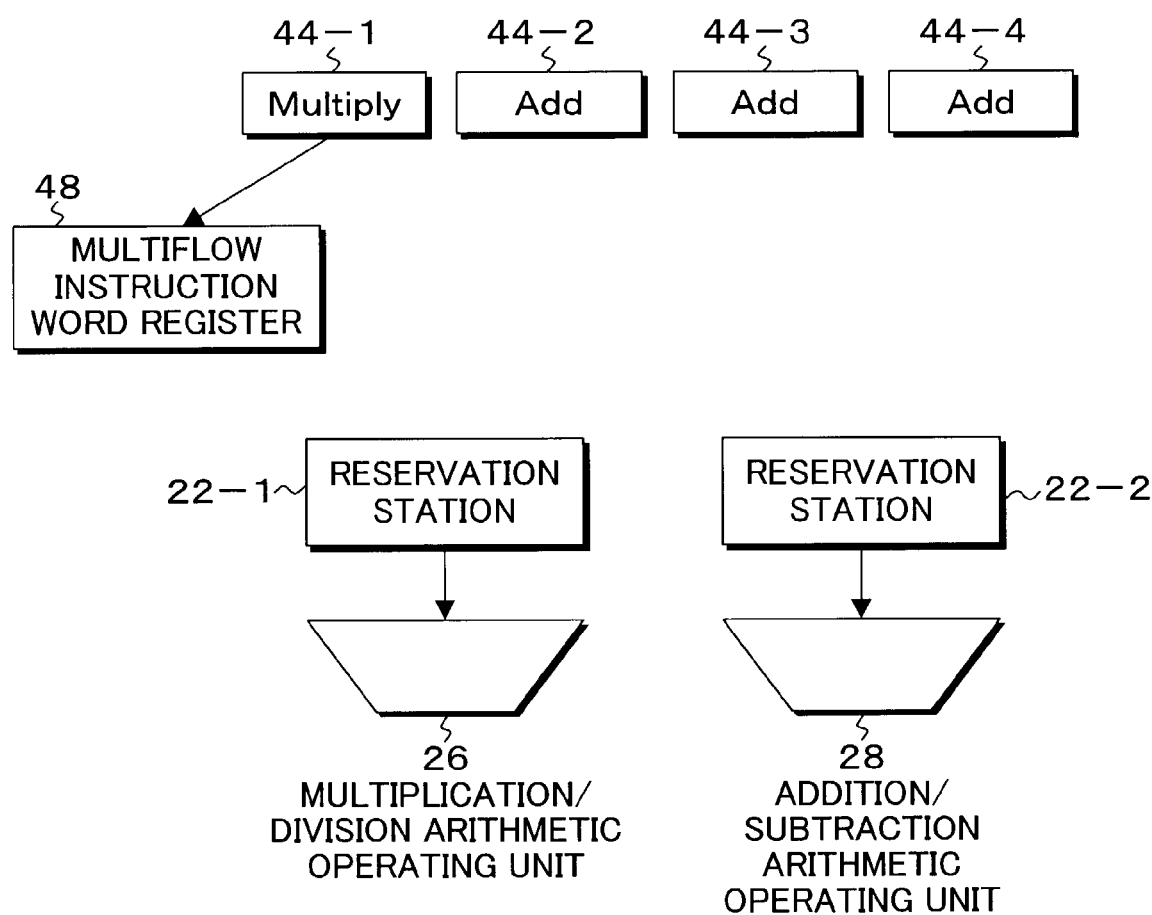
FIGS. 10A to 10C are explanatory diagrams of instruction issue control in the case where the asymmetry instruction has been fetched into the first instruction word register and decoded.
Figure 10B:
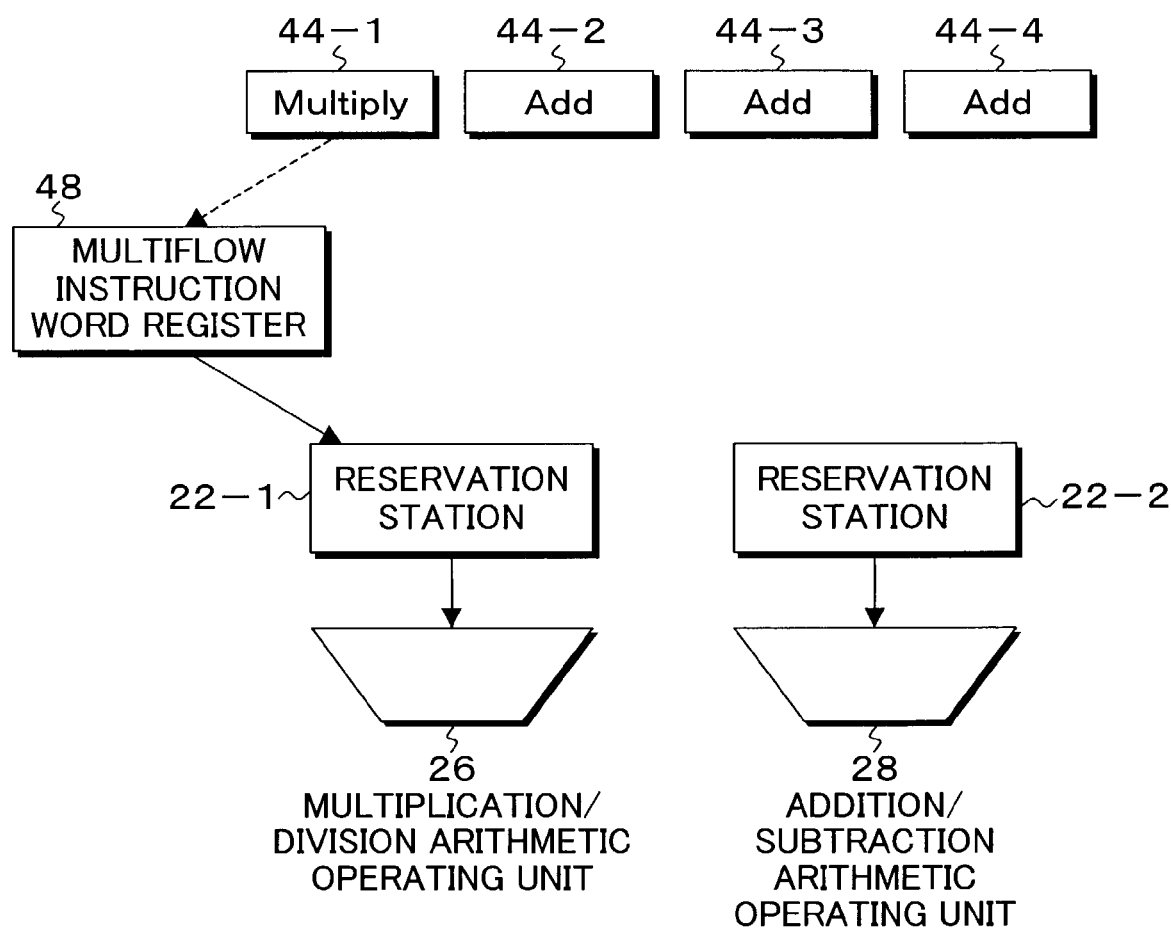
Figure 10C:
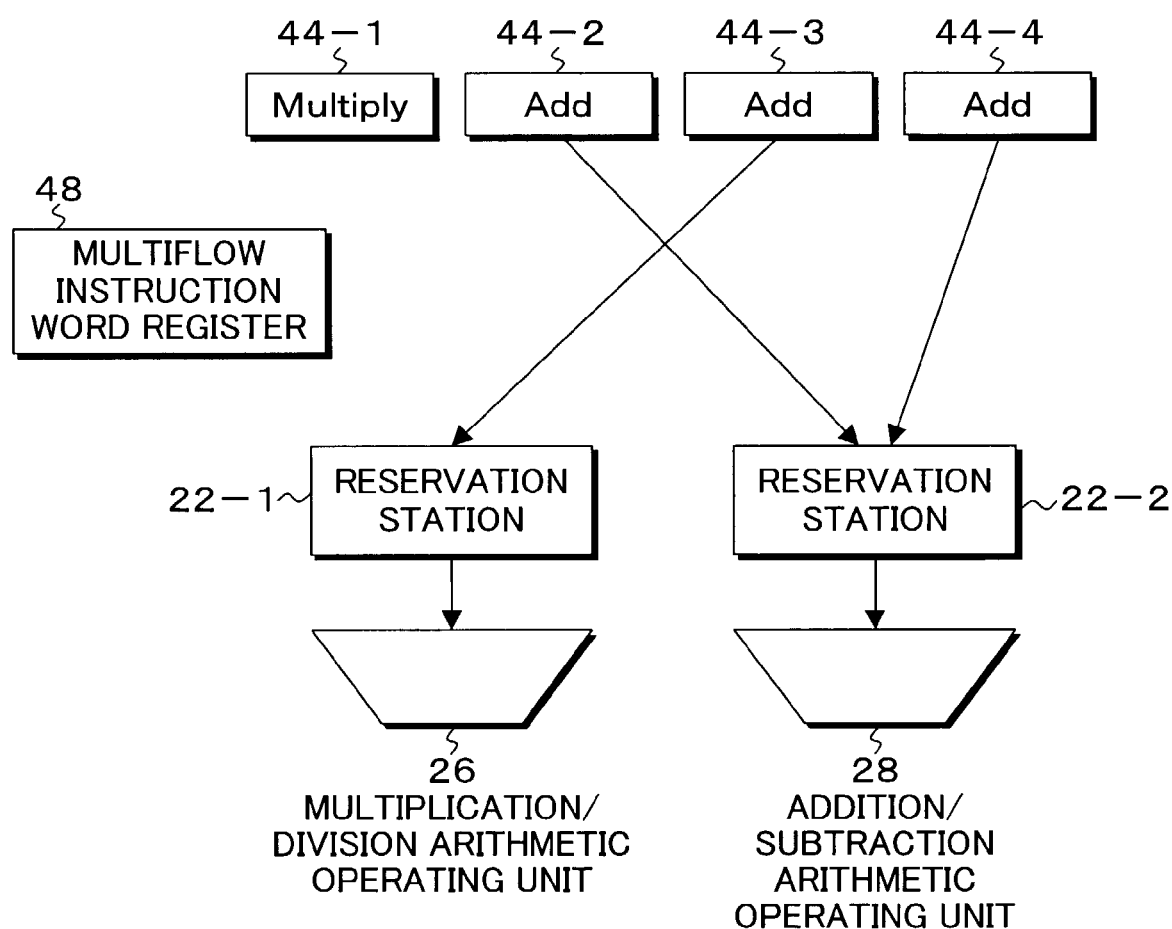

FIGS. 10A to 10C show instruction issue control in the case where the multiplying instruction Multiply has been fetched into the instruction word register 44-1 and decoded and the adding instruction Add as a symmetry instruction has been fetched into the residual instruction word registers 44-2 to 44-4 and decoded by the asymmetry instruction issuing unit 56 in FIG. 8. The adding instruction Add-is located behind the multiplying instruction Multiply. First, in the first decoding cycle in FIG. 10A, it is interpreted that the instruction fetched into the instruction word register 44-1 and decoded is the multiplying instruction Multiply as an asymmetry instruction. This instruction is handled as a no-operation nop and internally developed into the multiflow of the previous flow and the following flow. The multiplying instruction Multiply of the instruction word register 44-1 is transferred and held into the multiflow instruction word register 48 by the instruction operation of the first flow. Subsequently, in the second decoding cycle of FIG. 10B, the multiplying instruction Multiply as an asymmetry instruction stored in the multiflow instruction word register 48 is issued to the reservation station 22-1 which has been preset as a dedicated issuing destination of the asymmetry instruction by the instruction operation of the second flow. At this time, the instruction issuing operation is not performed with respect to the instruction word registers 44-2 to 44-4 to which the instruction is not issued yet. Subsequently, in the third decoding cycle of FIG. 10C, the adding instruction Add as a symmetry instruction locating behind the multiplying instruction Multiply is issued from the instruction word registers 44-2, 44-3, and 44-4 to the reservation stations 22-1 and 22-2 serving as an issuing destination which have been preset by the rule of the symmetry instruction issuing unit 58 in FIG. 8. Thus, the instruction issue by the in-order is maintained.

Figure 11A:
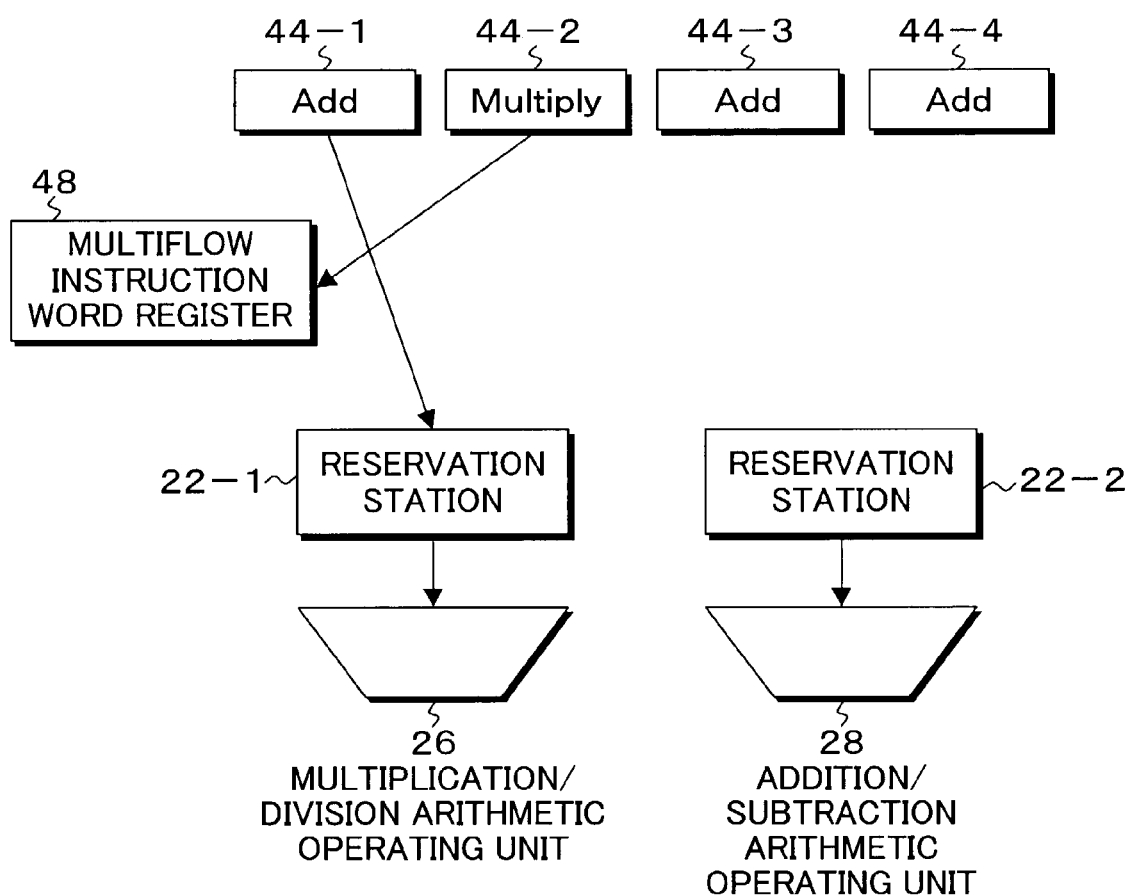
FIGS. 11A to 11C are explanatory diagrams of instruction issue control in the case where the asymmetry instruction has been fetched into the second instruction word register and decoded.
Figure 11B:
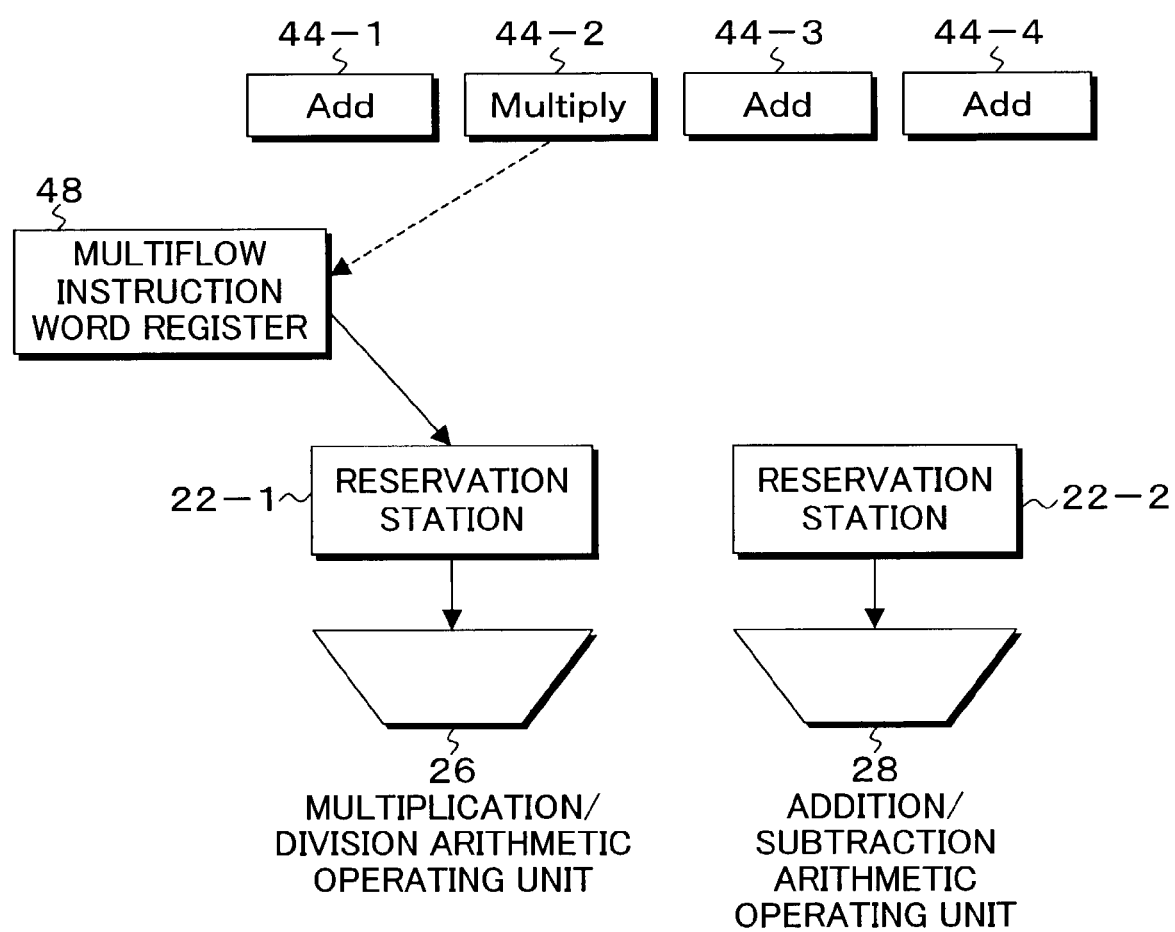
Figure 11C:
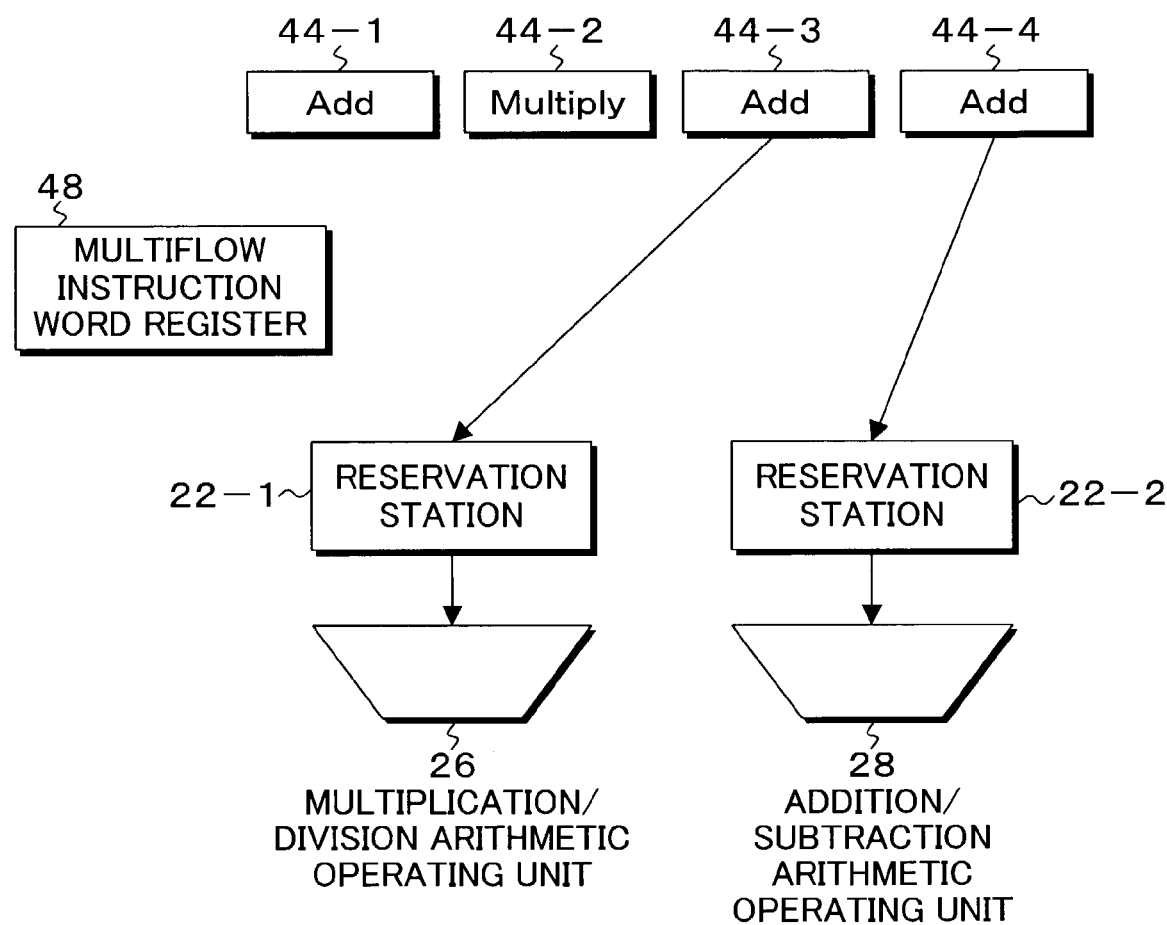

FIGS. 11A to 11C show the case where the multiplying instruction Multiply as an asymmetry-instruction has been fetched into the second instruction word register 44-2 from the left among the instruction word registers 44-1 to 44-4 and decoded and the adding instruction Add as a symmetry instruction has been fetched into the residual instruction word registers 44-1, 44-3, and 44-4 and decoded. The adding instruction Add of the instruction word register 44-1 is the previous instruction and the adding instruction Add of the instruction word registers 44-3 and 44-4 is the following instruction when they are seen from the instruction word register 44-2 in which the multiplying instruction Multiply has been fetched. In this case, since the multiplying instruction Multiply of the second instruction word register 44-2 in the first decoding cycle of FIG. 11A is developed into the multiflow, it is transferred and held into the multiflow instruction word register 48 by the instruction operation of the previous flow. In the next decoding cycle of FIG. 11B, the multiplying instruction Multiply is issued from the multiflow instruction word register 48 to the reservation station 22-1 as a dedicated issuing destination. With respect to the instruction word registers 44-1, 44-3, and 44-4 in which the adding instruction Add as a symmetry instruction has been fetched and decoded, in the first decoding cycle of FIG. 11A, the adding instruction Add of the instruction word register 44-1 locating before the multiplying instruction Multiply of the instruction word register 44-2 is issued to the reservation station 22-1 in accordance with the rule of the symmetry instruction issuing unit 58 in FIG. 8. In the third decoding cycle of FIG. 11C, the adding instruction Add of the instruction word registers 44-3 and 44-4 locating behind the multiplying instruction Multiply of the instruction word register 44-2 is issued to the reservation stations 22-1 and 22-2 in accordance with the rule of the symmetry instruction issuing unit 58. The instruction issue of the in-order is maintained.

Figure 12A:
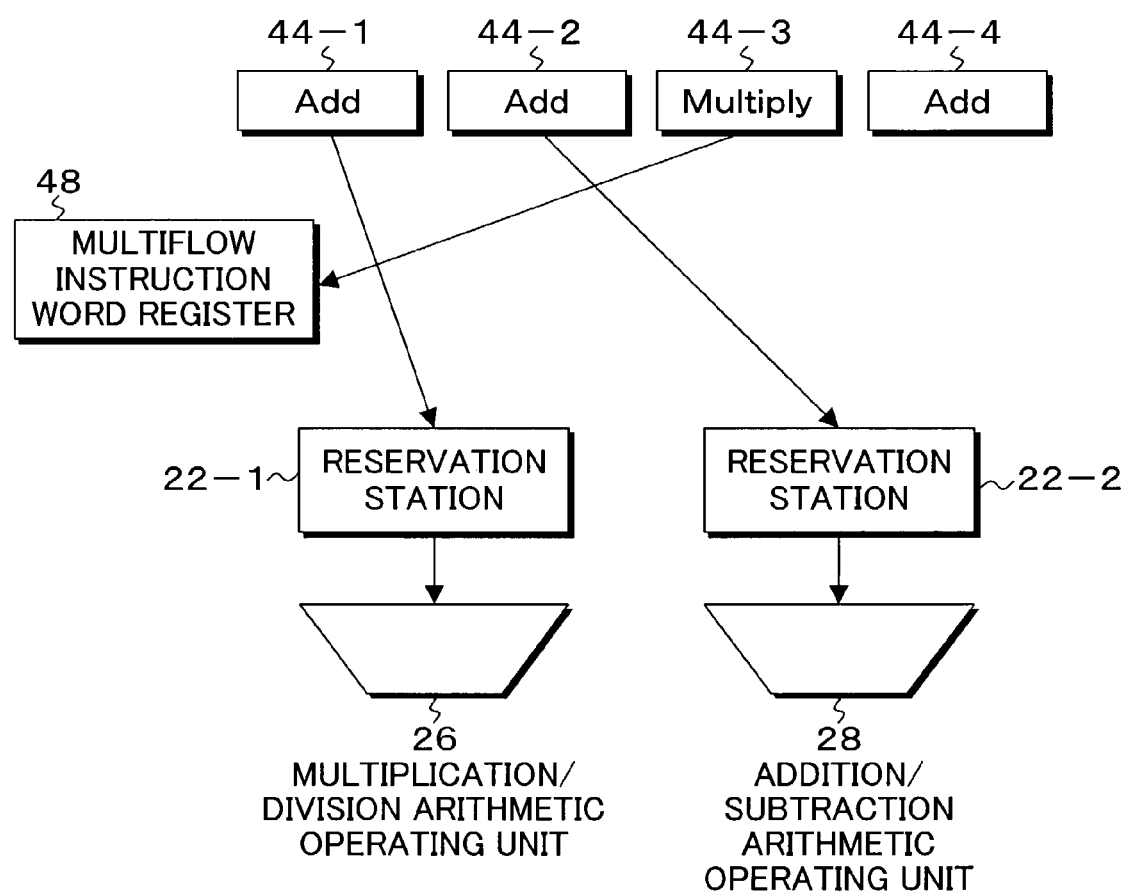
FIGS. 12A to 12C are explanatory diagrams of instruction issue control in the case where the asymmetry instruction has been fetched into the third instruction word register and decoded.
Figure 12B:
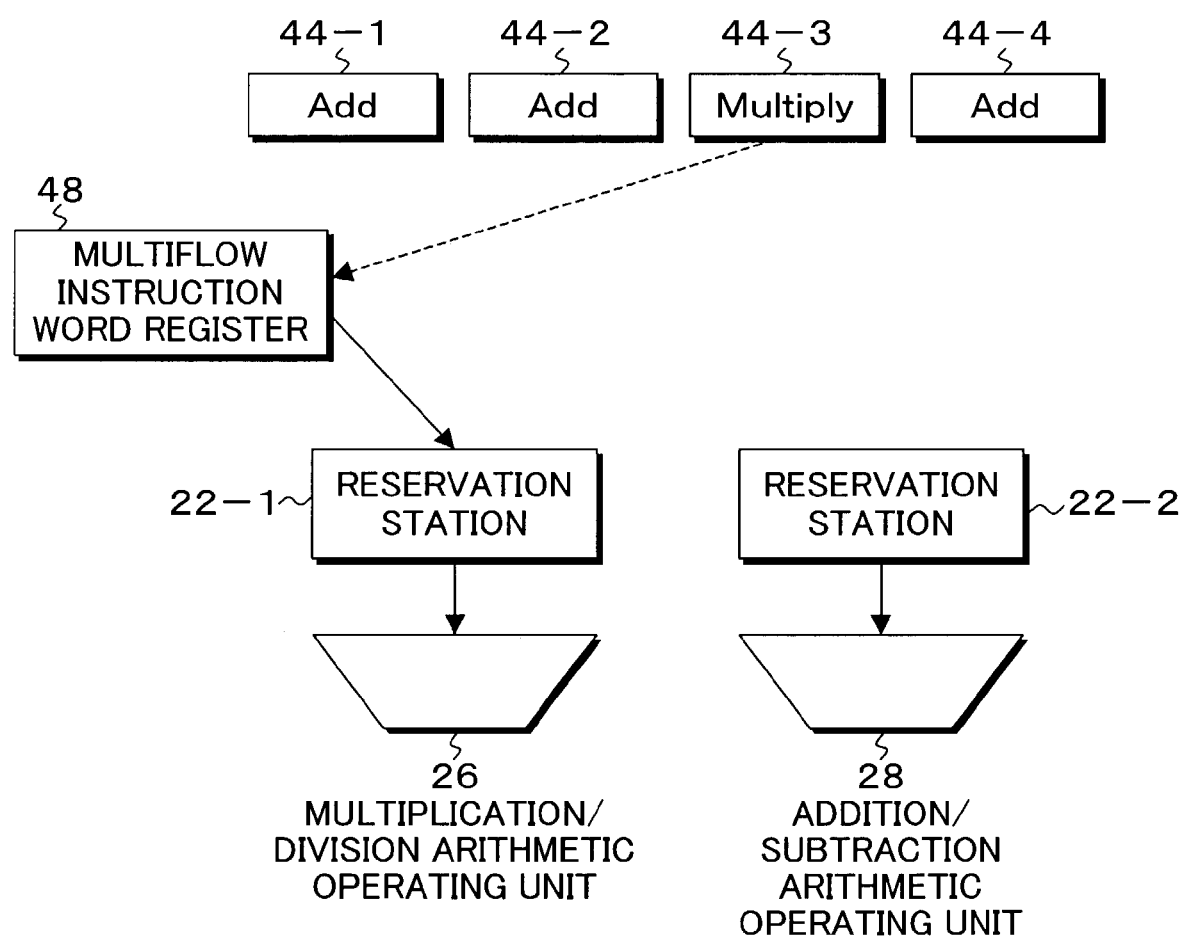
Figure 12C:
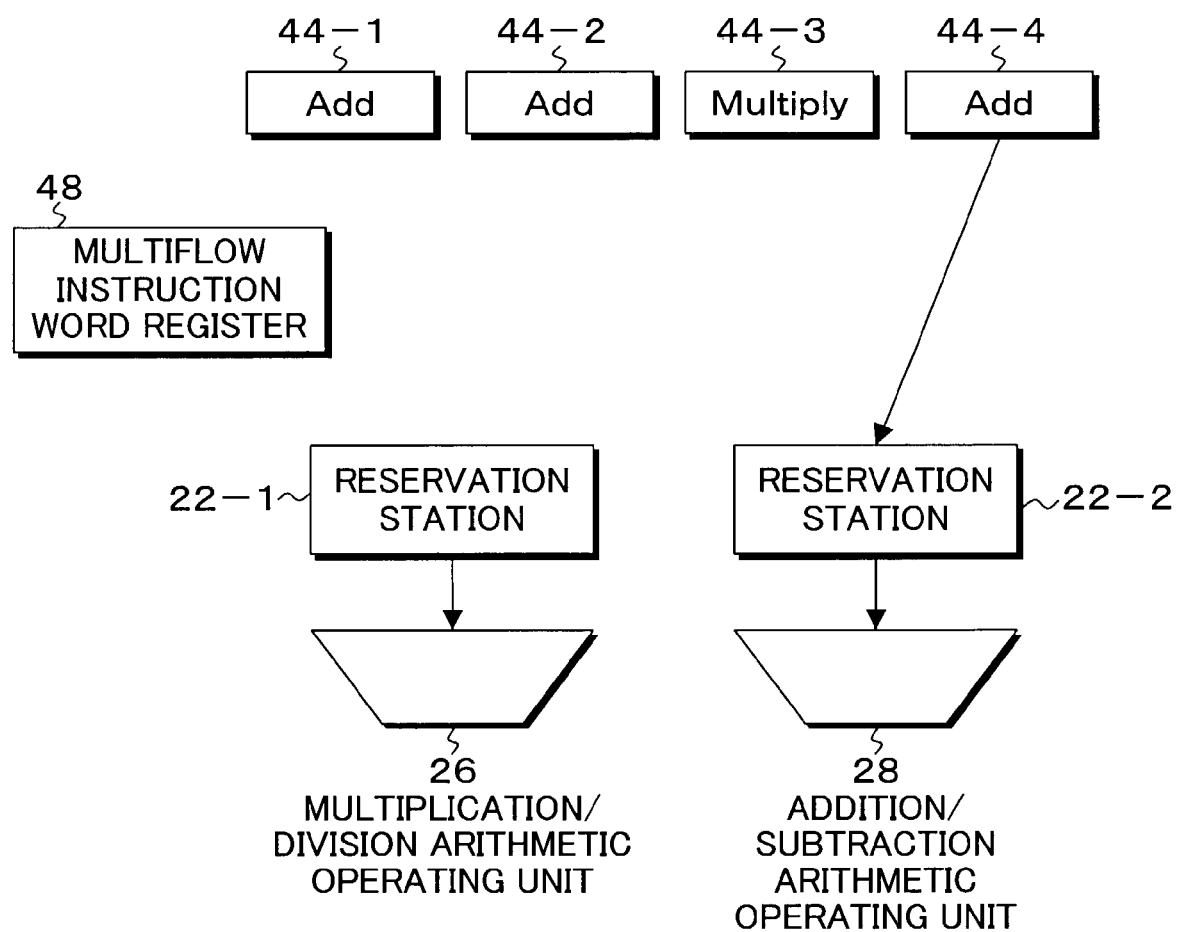

FIGS. 12A to 12C show instruction issue control in the case where the multiplying instruction Multiply as an asymmetry instruction has been fetched into the third instruction word register 44-3 from the left among the instruction word registers 44-1 to 44-4 and decoded and the adding instruction Add as a symmetry instruction has been fetched into the residual instruction word registers and decoded. Also in this case, in FIG. 12A, the multiplying instruction Multiply of the third instruction word register 44-3 is internally developed into the multiflow and transferred and held into the multiflow instruction word register 48 by the instruction operation of the first flow. In the second decoding cycle of FIG. 12B, the multiplying instruction Multiply is issued to the reservation station 22-1 as a dedicated issuing destination by the instruction operation of the following flow. With respect to the adding instruction Add of the instruction word registers 44-1 and 44-2 locating before the multiplying instruction Multiply of the instruction word register 44-3, it is issued to the reservation stations 22-1 and 22-2 in accordance with the rule of the symmetry instruction issuing unit 58 in FIG. 8 in the first decoding cycle of FIG. 12A. With respect to the adding instruction Add of the instruction word register 44-4 locating behind the multiplying instruction Multiply of the instruction word register 44-3, it is issued to the reservation station 22-2 in accordance with the rule of the symmetry instruction issuing unit 58 in FIG. 8 in the third decoding cycle of FIG. 12C. The instruction issue of the in-order is maintained.

Figure 13A:
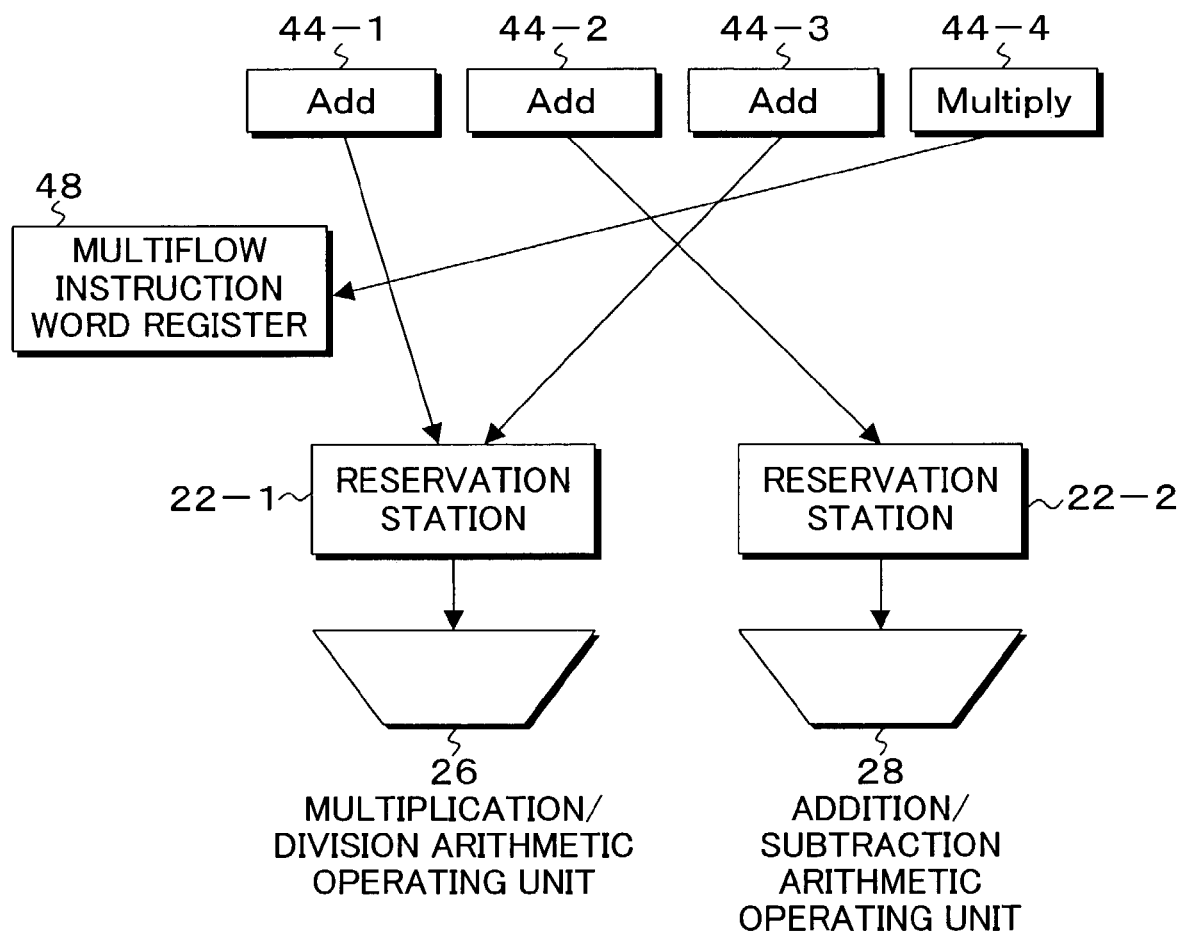
FIGS. 13A and 13B are explanatory diagrams of instruction issue control in the case where the asymmetry instruction has been fetched into the fourth instruction word register and decoded.
Figure 13B:
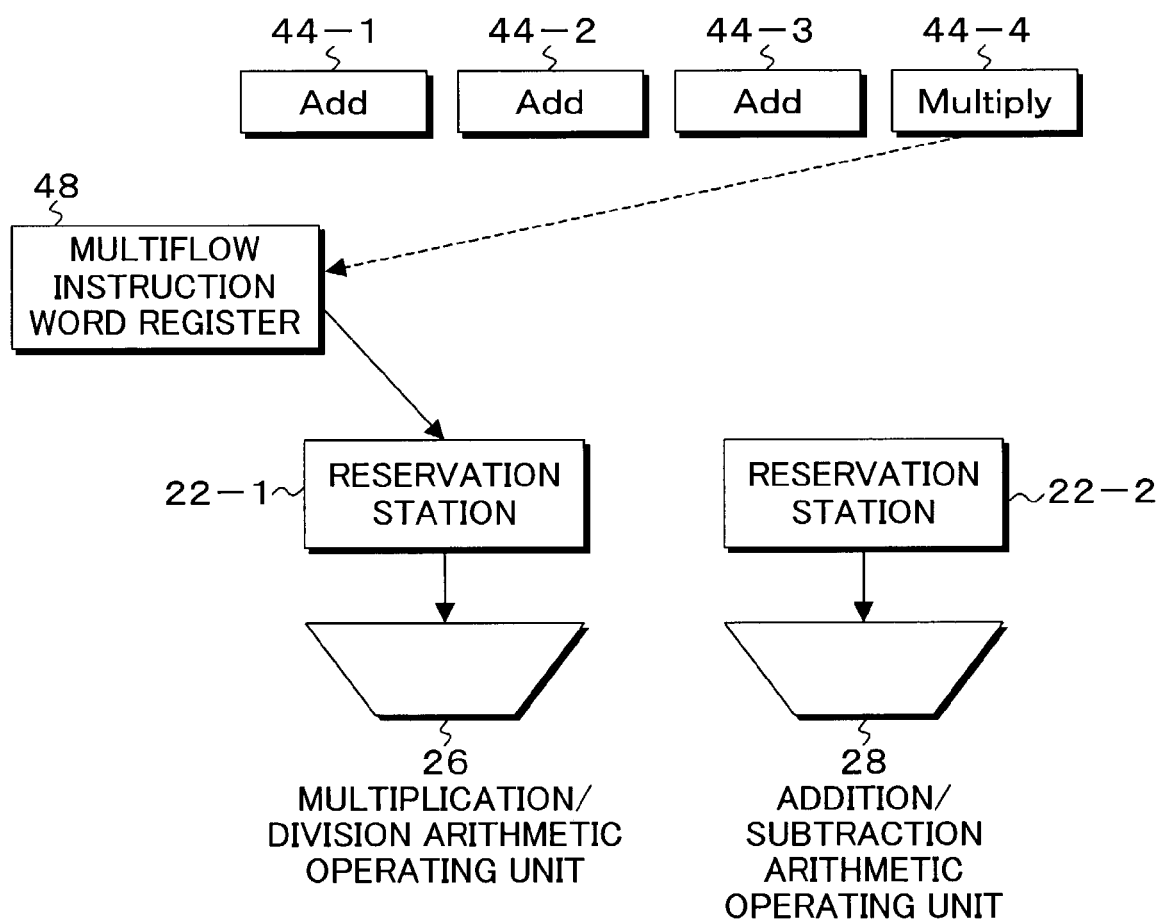

FIGS. 13A and 13B show instruction issue control in the case where the multiplying instruction Multiply as an asymmetry instruction has been fetched into the fourth instruction word register 44-4 from the left, that is, the register 44-4 locating at the right end among the instruction word registers 44-1 to 44-4 and decoded and the adding instruction Add as a symmetry instruction has been fetched into the residual instruction word registers 44-1 to 44-3 and decoded. That is, it corresponds to a case where all of the residual adding instructions Add are located in positions before the multiplying instruction Multiply serving as an asymmetry instruction. Also in this case, in the first decoding cycle of FIG. 13A, the multiplying instruction Multiply of the instruction word register 44-4 is internally developed into the multiflow and transferred and held into the multiflow instruction word register 48 by the instruction operation of the previous flow. In the second decoding cycle of FIG. 13B, the multiplying instruction Multiply is issued from the multiflow instruction word register 48 to the reservation station 22-1 as a dedicated issuing destination by the instruction operation of the following flow. With respect to the adding instruction Add as a symmetry instruction of the instruction word registers 44-1, 44-2, and 44-3, since the adding instruction Add is located before the multiplying instruction Multiply of the instruction word register 44-4, it is issued to the corresponding reservation stations 22-1 and 22-2 in accordance with the rule of the symmetry instruction issuing unit 58 in FIG. 8 in the first decoding cycle of FIG. 13A. The instruction issue by the in-order is maintained.

As shown in FIGS. 10A to 13B, even if, for example, the multiplying instruction Multiply has been fetched as an asymmetry instruction in arbitrary positions of the instruction word registers 44-1 to 44-4 and decoded, the asymmetry instruction is internally developed into the multiflow of the previous flow and the following flow, certainly transferred and held into the multiflow instruction word register 48 by the instruction operation of the previous flow, and thereafter, issued to the dedicated reservation station 22-1 which has been predetermined as an issuing destination of the asymmetry instruction by the instruction operation of the second flow. With respect to the residual three symmetry instructions, the instructions are issued to the reservation stations 22-1 and 22-2 in accordance with the issuing rule of the symmetry instructions shown in FIGS. 9A and 9B in the cycles before and after the decoding cycle for issuing the asymmetry instruction to the reservation station 22-1 from the multiflow instruction word register 48.

In the instruction issue control of the invention as mentioned above, although the selecting circuit and the priority switching circuit have been necessary hitherto, when the asymmetry instruction is issued, it is developed into the multiflow and issued only from the multiflow instruction word register and the instructions are not simultaneously issued from the instruction word register group of the symmetry instructions, thereby enabling the symmetry instructions from the instruction word registers to be selected and issued by the high operating frequency. When the asymmetry instruction is issued, since other instructions are not simultaneously issued, the selecting circuit is unnecessary and the control can be simplified. Although the number of decoding cycles is increased by developing the asymmetry instruction into the multiflow, since a frequency of the asymmetry instruction serving as a multiplying instruction and a dividing instruction is low, an influence which is exerted on the whole processing performance is small. That is, in the switching control of the issue of the asymmetry instruction to the dedicated reservation station by the conventional switching circuit as shown in FIG. 1, by installing the selecting circuit for issuing the symmetry instructions and the priority switching circuit for issuing the asymmetry instruction, the logic becomes deep and it makes it difficult to realize the high frequency circuit operation. In the invention, however, by developing the asymmetry instruction into the multiflow, the number of decoding cycles is increased by 1 with respect to the asymmetry instruction whose frequency of generation is low while keeping the high-speed clock operating frequency, thereby making the instruction issue control. Thus, the problem for improvement of the operating frequency of the processor can be avoided.

According to the invention as mentioned above, the asymmetry instruction whose instruction operation can be executed only by the specific arithmetic operating unit among a plurality of numerical value arithmetic operating units is internally developed into the multiflow of the previous flow and the following flow, the asymmetry instruction is transferred and held into the multiflow instruction word register by the instruction operation of the previous flow, the asymmetry instruction is issued to the dedicated reservation station corresponding to the arithmetic operating unit by the instruction operation of the next following flow, and even if the positions of the instruction word registers in which the asymmetry instruction is fetched and decoded are different, the issuing destination of the asymmetry instruction can be specified by the instruction issue control owing to the multiflow development without making the control logic in the decoding cycle deep. Thus, the problem in the realization of the high frequency is solved and the asymmetry instruction can be stored into the specific issuing destination.

Even if the number of decoding cycles is increased by the development of the asymmetry instruction into the multiflow, since the frequency of the asymmetry instruction is lower than that of the symmetry instruction, an influence on processing performance of the whole processor is small. Rather than that, the problem in the realization of the high frequency for the processor which operates on the order of GHz which is caused by the shallow control logic is avoided. The instruction executing operation can be guaranteed.

In the above embodiment, for simplicity of explanation, the case where one multiplication/division arithmetic operating unit 26 and one addition/subtraction arithmetic operating unit 28 are provided as numerical value arithmetic operating units for the instruction executing unit 24 in FIG. 7 has been mentioned as an example. However, the invention is not limited to it but can be also applied as it is to a case where further many arithmetic operating units are provided. Naturally, the reservation stations of the reservation station processing unit 20 are provided in correspondence to the number of instruction executing units 24.

The above embodiment has been described with respect to the example in which the multiplying instruction and the dividing instruction are used as asymmetry instructions and the adding instruction and the subtracting instruction are used as symmetry instructions. However, the invention is not limited to it but the instruction issue control of the invention can be also similarly applied on the assumption that in the case where a plurality of different kinds of arithmetic operating units are provided, if the instructions can be executed by the plurality of arithmetic operating units, they are set to the symmetry instructions, and if the instruction can be executed only by the specific limited arithmetic operating unit, it set to the asymmetry instructions.

The invention is not limited to the foregoing embodiment but incorporates many proper modifications without losing the object and advantages of the invention. Further, the invention is not limited by the numerical values shown in the foregoing embodiment.

What is claimed is:

1. A processor for executing instruction control in accordance with dynamic pipeline scheduling, comprising:
    an instruction issuing unit which issues instructions by in-order;
    an instruction executing unit which executes the instructions by out-of-order;
    a committing unit which discriminates a commitment of the instructions by the in-order and completes them;
    an instruction discriminating unit which discriminates whether all of a plurality of instructions which have simultaneously been fetched and decoded are symmetry instructions which can be arithmetically operated by different arithmetic operating units or there is an asymmetry instruction which can be arithmetically operated only by a specific arithmetic operating unit among said plurality of instructions and the residual instructions are said symmetry instructions;
    a symmetry instruction issuing unit which, in the case where it is determined that all of said plurality of instructions are the symmetry instructions, issues said symmetry instructions to a plurality of reservation stations provided for every different arithmetic operating units until they become full; and
    an asymmetry instruction issuing unit which, in the case where it is determined that the asymmetry instruction exists among said plurality of instructions and the residual instructions are the symmetry instructions, develops said asymmetry instruction into a multiflow of a previous flow and a following flow, issues said asymmetry instruction to the reservation station provided for said specific arithmetic operating unit, and issues the residual symmetry instructions to said plurality of reservation stations provided for said every different arithmetic operating units in an issuing cycle different from that of said asymmetry instruction until they become full;
    wherein there is a one-to-one correspondence of reservation stations to arithmetic operating unit; and
    wherein said asymmetry instruction issuing unit transfers the asymmetry instruction held in an instruction word register group to a multiflow instruction word register and holds it in a decoding cycle of the previous flow and issues the asymmetry instruction in said multiflow instruction word register to the corresponding reservation station in a decoding cycle of the following flow.

2. A processor according to claim 1, wherein said asymmetry instruction issuing unit issues the symmetry instructions locating before the asymmetry instruction held in said instruction word register group to said plurality of reservation stations in the decoding cycle of the previous flow and, further, issues the residual symmetry instructions to said plurality of reservation stations in a decoding cycle following the decoding cycle of the following flow.

3. A processor according to claim 1, wherein said symmetry instruction issuing unit and said asymmetry instruction issuing unit issue the symmetry instructions held in said instruction word register group to the reservation station in correspondence to a position of the register.

4. A processor according to claim 3, wherein when the symmetry instructions are issued to said predetermined reservation station, if the reservation station is full, said symmetry instruction issuing unit and said asymmetry instruction issuing unit issue said symmetry instructions to another reservation station having an empty space.

5. A processor according to claim 1, wherein said symmetry instruction is an adding instruction or a subtracting instruction, said asymmetry instruction is a multiplying instruction or a dividing instruction, and said executing unit is provided with:
    an asymmetry instruction arithmetic operating unit which can execute arithmetic operations of said adding instruction, said subtracting instruction, said multiplying instruction, and said dividing instruction; and
    a symmetry instruction arithmetic operating unit which can execute the arithmetic operations of said adding instruction and said subtracting instruction.

6. An instruction control method of executing instructions in accordance with dynamic pipeline scheduling, comprising:
- an instruction issuing step wherein the instructions are issued by in-order;
- an instruction executing step wherein the instructions are executed by out-of-order;
- a committing step wherein a commitment of the instructions is discriminated by the in-order and said instructions are completed;
- an instruction discriminating step wherein whether all of a plurality of instructions which have simultaneously been fetched and decoded are symmetry instructions which can be arithmetically operated by different arithmetic operating units or there is an asymmetry instruction which can be arithmetically operated only by a specific arithmetic operating unit among said plurality of instructions and the residual instructions are said symmetry instructions is discriminated;
- a symmetry instruction issuing step wherein in the case where it is determined that all of said plurality of instructions are the symmetry instructions, said symmetry instructions are issued to a plurality of reservation stations provided for every different arithmetic operating units until they become full; and
- an asymmetry instruction issuing step wherein in the case where it is determined that the asymmetry instruction exists among said plurality of instructions and the residual instructions are said symmetry instructions, said asymmetry instruction is developed into a multi-flow of a previous flow and a following flow, said asymmetry instruction is issued to the reservation station provided in correspondence to said specific arithmetic operating unit, and the residual symmetry instructions are issued to said plurality of reservation stations provided for said every different arithmetic operating units in an issuing cycle different from that of said asymmetry instruction until they become full;
- wherein in said asymmetry instruction issuing step, the asymmetry instruction held in an instruction word register group is transferred and held into a multiflow instruction word register in a decoding cycle of the previous flow and the asymmetry instruction in said multiflow instruction word register is issued to the corresponding reservation station in a decoding cycle of the following flow.

7. A method according to claim 6, wherein in said asymmetry instruction issuing step, the symmetry instructions locating before the asymmetry instruction held in said instruction word register group are issued to said plurality of reservation stations in the decoding cycle of the previous flow and, further, the residual symmetry instructions are issued to said plurality of reservation stations in a decoding cycle following the decoding cycle of the following flow.

8. A method according to claim 6, wherein in said symmetry instruction issuing step and said asymmetry instruction issuing step, symmetry instructions held in said instruction word register group are issued to the reservation station in correspondence to a position of said register, and if a using state of the reservation station of this issuing destination is full, said symmetry instructions are issued to another reservation station having an empty space in the using state.

9. A processor for executing instruction control in accordance with dynamic pipeline scheduling, comprising:
- an instruction issuing unit which issues instructions by in-order;
- an instruction executing unit which executes the instructions, by out-of-order;
- a committing unit which discriminates a commitment of the instructions by the in-order and completes them;
- an instruction discriminating unit which discriminates whether all of a plurality of instructions which have simultaneously been fetched and decoded are symmetry instructions which can be arithmetically operated by different arithmetic operating units or there is an asymmetry instruction which can be arithmetically operated only by a specific arithmetic operating unit among said plurality of instructions and the residual instructions are said symmetry instructions;
- a plurality of reservation stations provided for the arithmetic operating units, each of the reservation stations having a plurality of entries;
- a symmetry instruction issuing unit which, in the case where it is determined that all of said plurality of instructions are the symmetry instructions, issues said symmetry instructions to any one of the plurality of reservation stations until the entries become full; and
- an asymmetry instruction issuing unit which, in the case where it is determined that the asymmetry instruction exists among said plurality of instructions and the residual instructions are the symmetry instructions, develops said asymmetry instruction into a multiflow of a previous flow and a following flow, issues said asymmetry instruction to a specific reservation station provided for said specific arithmetic operating unit, and issues the residual symmetry instructions to any one of the plurality of reservation stations provided for said every different arithmetic operating units in an issuing cycle different from that of said asymmetry instruction until they become full; and
- wherein said asymmetry instruction issuing unit transfers the asymmetry instruction held in an instruction word register group to a multiflow instruction word register and holds it in a decoding cycle of the previous flow and issues the asymmetry instruction in said multiflow instruction word register to the corresponding reservation station in a decoding cycle of the following flow.

* * * * *

UNITED STATES PATENT AND TRADEMARK OFFICE
CERTIFICATE OF CORRECTION

| | | |
|---|---|---|
| PATENT NO. | : 7,337,304 B2 | Page 1 of 1 |
| APPLICATION NO. | : 10/349085 | |
| DATED | : February 26, 2008 | |
| INVENTOR(S) | : Toshio Yoshida | |

It is certified that error appears in the above-identified patent and that said Letters Patent is hereby corrected as shown below:

Column 14, Line 28, change "unit;" to --units;--.

Column 16, Line 14, before "by" delete ",".

Signed and Sealed this

Twenty-sixth Day of August, 2008

JON W. DUDAS
*Director of the United States Patent and Trademark Office*